United States Patent
Ikuta et al.

(10) Patent No.: US 7,503,517 B2
(45) Date of Patent: Mar. 17, 2009

(54) SPOOL BRAKING DEVICE FOR DUAL BEARING REEL

(75) Inventors: Takeshi Ikuta, Sakai (JP); Ken'ichi Kawasaki, Sakai (JP); Shouji Nakagawa, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/581,348

(22) Filed: Oct. 17, 2006

(65) Prior Publication Data

US 2007/0108330 A1 May 17, 2007

(30) Foreign Application Priority Data

Nov. 15, 2005 (JP) .............................. 2005-330248

(51) Int. Cl.
*A01K 89/01* (2006.01)
(52) U.S. Cl. ...................................... 242/288; 242/286
(58) Field of Classification Search .................. 242/286, 242/288, 289
See application file for complete search history.

(56) References Cited

U.S. PATENT DOCUMENTS

| | | | | |
|---|---|---|---|---|
| 4,544,111 A | | 10/1985 | Nakajima | |
| 4,585,183 A | * | 4/1986 | Puryear | 242/288 |
| 4,593,866 A | * | 6/1986 | Moosberg et al. | 242/288 |
| 4,714,208 A | * | 12/1987 | Holahan et al. | 242/288 |
| 4,940,194 A | | 7/1990 | Young | |
| 5,248,113 A | * | 9/1993 | Daniels | 242/246 |
| 6,045,076 A | * | 4/2000 | Daniels | 242/287 |
| 6,412,722 B1 | | 7/2002 | Kreuser et al. | |
| 6,973,999 B2 | * | 12/2005 | Ikuta et al. | 188/161 |
| 6,983,907 B2 | * | 1/2006 | Ikuta et al. | 242/288 |
| 7,159,813 B2 | * | 1/2007 | Ikuta et al. | 242/289 |
| 7,188,793 B2 | * | 3/2007 | Ikuta et al. | 242/223 |
| 2005/0218255 A1 | | 10/2005 | Ikuta et al. | |
| 2006/0169813 A1 | * | 8/2006 | Nakagawa et al. | 242/288 |
| 2007/0108330 A1 | * | 5/2007 | Ikuta et al. | 242/288 |

FOREIGN PATENT DOCUMENTS

EP  1 477 060 A1  11/2004
JP  H11-332436  12/1999

* cited by examiner

*Primary Examiner*—Emmanuel M Marcelo
(74) *Attorney, Agent, or Firm*—Shinjyu Global IP

(57) ABSTRACT

A spool braking mechanism for a dual bearing reel includes a spool braking unit, a setting knob, an adjustment knob, and a spool controlling unit. The spool controlling unit is arranged between a spool and a reel body, and is an electrically controllable unit that controls the spool. The setting knob is movably disposed on the reel unit and is selectively positioned in a plurality of first operating positions. The setting knob is movably disposed on the reel unit and is selectively positioned in a plurality of second operating positions. The spool braking unit electrically controls the spool braking unit according to the first and second operating positions.

20 Claims, 14 Drawing Sheets

SPOOL BRAKING DEVICE FOR DUAL BEARING REEL

CROSS-REFERENCE TO RELATED APPLICATIONS

This application claims priority under 35 U.S.C. § 119 to Japanese Patent Application No. 2005-330248 filed on Nov. 15, 2005. The entire disclosure of Japanese Patent Application No. 2005-330248 is hereby incorporated herein by reference.

BACKGROUND OF THE INVENTION

1. Field of the Invention

The present invention relates to a braking device. More specifically, the present invention relates to a spool braking device for a dual bearing reel.

2. Background Information

A spool braking device is provided in dual bearing reels, especially bait casting reels that release fishing line during casting, in order to prevent backlash during casting. A centrifugal braking device that uses centrifugal force, a magnet braking device that uses magnetic flux generated by magnets, and the like, have been conventionally known as spool braking devices. In addition, technology that electronically controls and brakes a rotation in the line-releasing direction of a spool that is rotatably mounted to a reel unit has been recently disclosed (see, for example, Japanese Laid-Open Patent Application No. H11-332436). Conventional electronically controlled braking devices include a circuit board that is arranged in an interior of the reel unit and a plurality of electrical components disposed on the circuit board. The electrical components include a microcomputer and a sensor that detects a rotational speed of the spool. In addition, a plurality of magnets is mounted to a spool shaft and is sequentially arranged in a rotational direction around the spool shaft. A plurality of coils are connected to the circuit board and disposed around an outer periphery of the magnets. The spool is braked by utilizing the electric power generated in the coils by the rotation of the spool.

In addition, the conventional electrically controlled braking devices are configured to be able to adjust the braking force by a dial. Specifically, they are configured so that the braking force is changed by adjusting the extent of overlap between the coils and the magnets in the axial direction.

Casting conditions widely vary. To take fishing line as an example, the relative density of fishing line made of polyamide resin, fluorocarbon, or polyethylene are each different. Therefore, when the fishing line is wound around the spool, the mass of the spool is changed by the fishing line. Accordingly, the moment of inertia of the spool changes. In addition, the mass of tackle such as a lure, mounted on a tip of the fishing line change depending on the tackle type. The rotational speed of the spool in casting is changed by the above described change of the moment of inertia and the mass of a tackle. In addition, the spool speed in casting is changed depending on the casting methods such as a full-casting, light-casting, and the like. Furthermore, resistance exerted by the tackle changes depending on situations at fishing spots such as a head wind or a tailwind. Thus, the flying speed of the tackle in casting may change.

In the above described conventional configuration, the braking force is adjusted with a dial. Because of this, adjustment with the dial may cope with the mass change of the tackle. However, the braking force is adjusted in a stepwise fashion. Therefore, there is a possibility of backlash when casting conditions change, such as when a fishing line with a mass that is different from that of the configured fishing line being used, when a head wind blows, or a when full-casting is performed. In addition, other problems may occur such as when a fishing line with a small mass is used or when a tailwind blow, thus creating a situation in which the tackle is not cast far enough and/or a situation in which the tackle is cast too far. Accordingly, the tackle may be cast to a position remote from a target position. Thus there is a possibility that casting performance cannot be maintained.

In order to maintain the casting performance, the braking force can be minutely adjusted with an operating member and can be configured depending on casting conditions. However, when adjustment of the braking force is minutely performed with the operating member, delicate maneuver is required for minute moving distance. Therefore, the operation becomes cumbersome, and it is also difficult to promptly find out an optimal setting depending on casting conditions.

In view of the above, it will be apparent to those skilled in the art from this disclosure that there exists a need for an improved spool braking device for a dual bearing reel for promptly finding an optimal setting for casting conditions with an easy operation. This invention addresses this need in the art as well as other needs, which will become apparent to those skilled in the art from this disclosure.

SUMMARY OF THE INVENTION

A spool braking device for a dual bearing reel in accordance with a first aspect of the present invention includes a spool braking unit, a first operating member, a second operating member and a spool controlling unit. The spool braking unit is configured to brake for a spool. The first operating member is configured to be movably mounted to a reel unit. The first operating member is configured and arranged to be selectively moved to a plurality of first operating positions. The second operating member is configured to be movably mounted to the reel unit. The second operating member is configured and arranged to be selectively moved to a plurality of second operating positions. The spool controlling unit is configured to control a braking force of the spool braking unit according to the first operating positions of the first operating member and the second operating positions of the second operating member.

This spool braking device for a dual bearing reel is provided with two operating members; that is, the first operating member and the second operating member. For example, combining a number of 4 braking levels of the first operating member and 8 braking levels of the second operating member provides 32 braking force levels without minutely setting the moving distances of the operating members. Here, a plurality of levels of the braking force is able to be performed without minutely setting the moving distances of the first and second operating members by properly using two operating members so that the optimal casting condition is able to be promptly found out with an easy operation.

The spool braking device for a dual bearing reel in accordance a with a second aspect of the present invention is the spool braking device according to the first aspect of the present invention, wherein the spool braking unit is configured to electrically control braking for the spool, and the spool controlling unit is configured to electrically control a braking force of the spool braking unit. In this case, since the spool braking unit can be controlled electrically but not mechanically, it is possible to minute control the spool braking unit according to types of fishing line, conditions at fishing spots, and the like.

For example, it is possible to select one of the plurality of braking modes according to casting conditions by the first operating member, and it is possible to adjust the strength of the selected braking mode by the second operating member. In addition, it is possible to arbitrarily select a combination of the braking mode and the strength of the braking force according to a combination of the operating positions of the two operating members. Here, two operating members are provided for setting the braking force. Therefore, it is possible to minutely adjust the braking properties according to a plurality of casting conditions such as a change in the mass of a tackle, types of fishing line, casting methods, conditions at fishing spots, and the like, by properly using both functions of the two operating members without minutely setting the moving distance of the operating members. Because of this, operation of the two operating members will make it possible to promptly find out an optimal casting condition with an easy operation.

The spool braking device for a dual bearing reel pertaining to a third aspect of the present invention is the spool braking device according to the second aspect of the present invention, wherein the spool controlling unit controls the spool braking unit with strength braking patterns in which strengths of a plurality of basic braking patterns whose degree of time-series variation of braking force are different from each other are varied. In this case, it is possible to select the basic braking pattern and the strength thereof according to casting conditions. Therefore, it is possible to appropriately deal with a variety of casting conditions.

The spool braking device for a dual bearing reel pertaining to a fourth aspect of the present invention is the spool braking device according to the third aspect of the present invention, wherein the spool braking unit includes a first selection device that selects any of a plurality of braking modes including at least one of the plurality of basic braking patterns according to the first operating position of the first operating member, and a second selection device that selects one of the plurality of strength braking patterns of the braking mode selected according to the second operating position of the second operating member, and controls the spool braking unit by the selected strength braking pattern. In this case, roles of the first operating member and the second operating member are clear. Therefore, selection of the braking mode is easy.

The spool braking device for a dual bearing reel pertaining to a fifth aspect of the present invention is the spool braking device according to one of the first through fourth aspects of the present invention, further comprising an operation regulating mechanism that regulates an operation of the first operating member. In this case, it is possible to prevent the first operating member from moving by mistake while fishing by regulating the first operating member, for example, by preventing the first operating member from being operated without opening a cover, by applying greater resistance to the first operating member than to the second operating member so that it becomes difficult for the first operating member to move, and by making it possible to lock/unlock the movement of the first operating member. Because of this, it will be difficult to change an optimal setting by mistake.

The spool braking device for a dual bearing reel pertaining to a sixth aspect of the present invention is the spool braking device according to one of the second through fifth aspects of the present invention, wherein the spool braking unit includes a rotor that comprises a plurality of magnets which are aligned in a rotational direction, have interchangeably opposite polarities, and rotates in association with the spool, a plurality of coils that are serially connected and mounted to a portion of the reel unit at predetermined intervals in the circumferential direction so that they surround the rotor, and a switch element that is connected to both ends of the plurality of coils serially connected to each other, and controls the spool braking unit by controlling an on/off state of the switch element. In this case, loading applied to electricity flowing through coils can be changed by controlling the on/off state of the switch element during rotation of the spool when casting or the like, and thus the spool braking unit can be minutely controlled with an arbitrary braking force.

The spool braking device for a dual bearing reel pertaining to a seventh aspect of the present invention is the spool braking device according to the sixth aspect of the present invention, wherein the spool controlling unit controls the on/off state of the switch element by controlling a duty ratio of pulse width modulation (PWM) signals with a predetermined cycle. In this case, the braking force can be easily controlled by controlling the duty ratio of the PWM signals.

The spool braking device for a dual bearing reel pertaining to a eighth aspect of the present invention is the spool braking device according to the seventh aspect of the present invention, wherein any of the plurality of the basic braking patterns is configured such that after a first time period has elapsed since start of casting and then the spool is braked with the constant duty ratio of 20% to 100% of the maximum braking force during a second time period, the spool is braked with the duty ratio that gradually decreases from the constant duty ratio during a third time period. In this case, tension is rapidly increased by braking the spool by relatively strong braking force during a period in which the rotational speed is relatively high immediately after casting. Accordingly, it is possible to prevent backlash from occurring, and a tackle stably flies. Because of this, backlash can be prevented, and the tackle can be cast out further while the attitude of the tackle can be stabilized. In addition, when the rotational speed slows down, it is possible to prevent decreasing of the flying distance of the tackle by gradually decreasing the braking force.

A dual bearing reel in accordance with a ninth aspect of the present invention, which includes a spool unit, a spool, a handle, and a spool braking device for braking the spool according to the first through eighth aspects of the present invention. The reel unit includes a frame having first and second side plates disposed apart from each other, first and second side covers covering outer sides of the first and the second side plates respectively. The spool is rotatably mounted to the reel body. The handle turns over the spool.

With this dual bearing reel, the same working effects as one of the first through eighth aspects of the present invention is obtainable.

The dual bearing reel in accordance with a tenth aspect of the present invention is the dual bearing reel according to the ninth aspect of the present invention, wherein the first side cover is configured and arranged to expose the first operating member and cover the second operating member. In this case, since the second operating member is covered, it is possible to keep the second operating member immobilized while fishing. Thus, it prevents the optimal setting from changing by a malfunction.

The dual bearing reel in accordance with an eleventh aspect of the present invention is the dual bearing reel according to the ninth aspect of the invention, wherein the first side cover is configured and arranged to expose the first and second operating members. In this case, since both of the operating members are exposed outside, it is easy to perform a minute setting by using both of the first and second operating members.

The dual bearing reel in accordance with a twelfth aspect of the present invention is the dual bearing reel according to one of the ninth through eleventh aspects of the present invention, wherein the first and second operating members are coaxially arranged. In this case, since both of the first and second operating members are arranged coaxially, a compact arrangement of the first and second operating members is provided.

According to the present invention, a plurality of levels of the braking force is able to be performed without minutely setting the moving distances of the operating members by properly using two operating members, so that the optimal casting condition is able to be promptly found with an easy operation.

Also, two operating members are provided for setting the braking force. Therefore, it is possible to minutely adjust the braking properties according to a plurality of casting conditions such as the mass change of a tackle, types of fishing line, casting methods, situations of fishing spots, and the like by properly using the two operating members without setting moving distance of the operating members. Because of this, it will be possible to find out an optimal casting condition promptly with an easy operation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Configuration of the Reel

Figure 1:
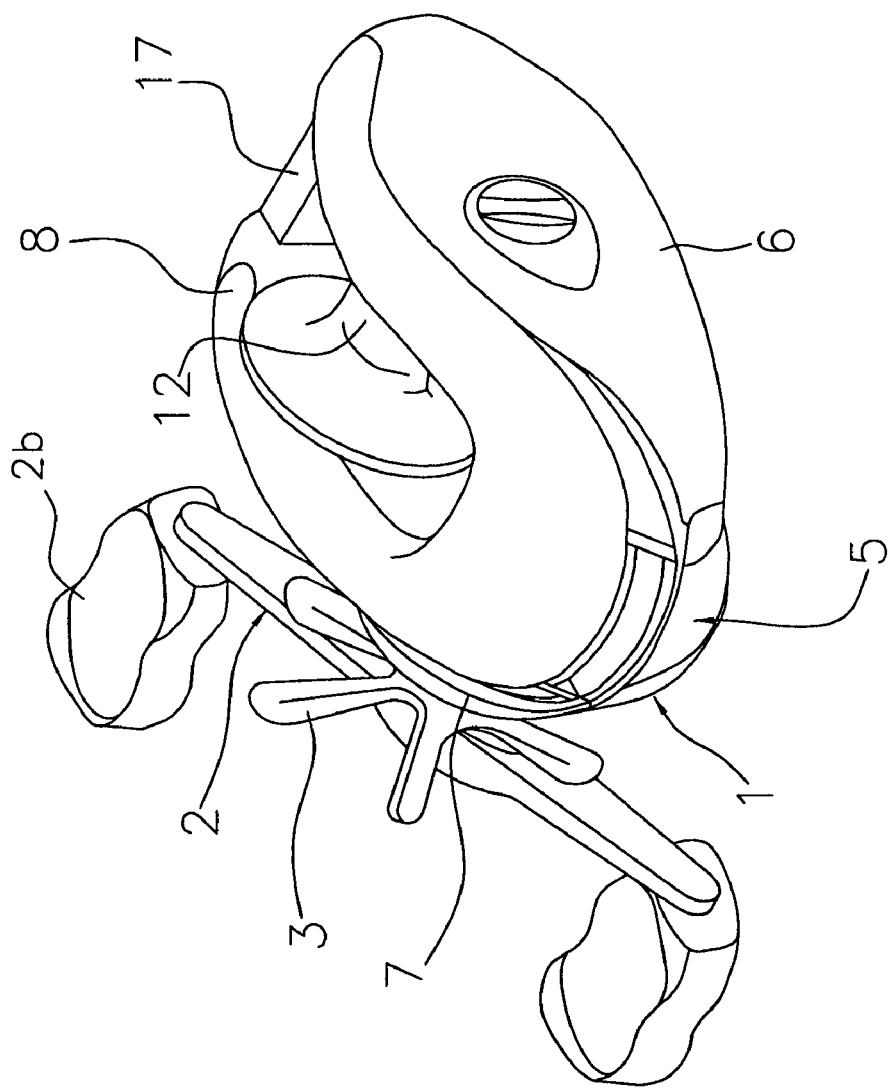
FIG. 1 is a perspective view of a dual bearing reel equipped with a spool braking device in accordance with a first embodiment of the present invention.

Referring initially to FIG. 1, a dual bearing reel is illustrated in accordance with a first embodiment of the present invention. The dual bearing reel is a low-profile dual bearing reel for bait casting. The dual bearing reel includes a reel unit 1, a handle 2 and a star drag 3. The handle 2 is arranged on a side of the reel unit 1. The star drag 3 is for adjusting drag and is arranged on a reel unit side of the handle 2.

Figure 2:
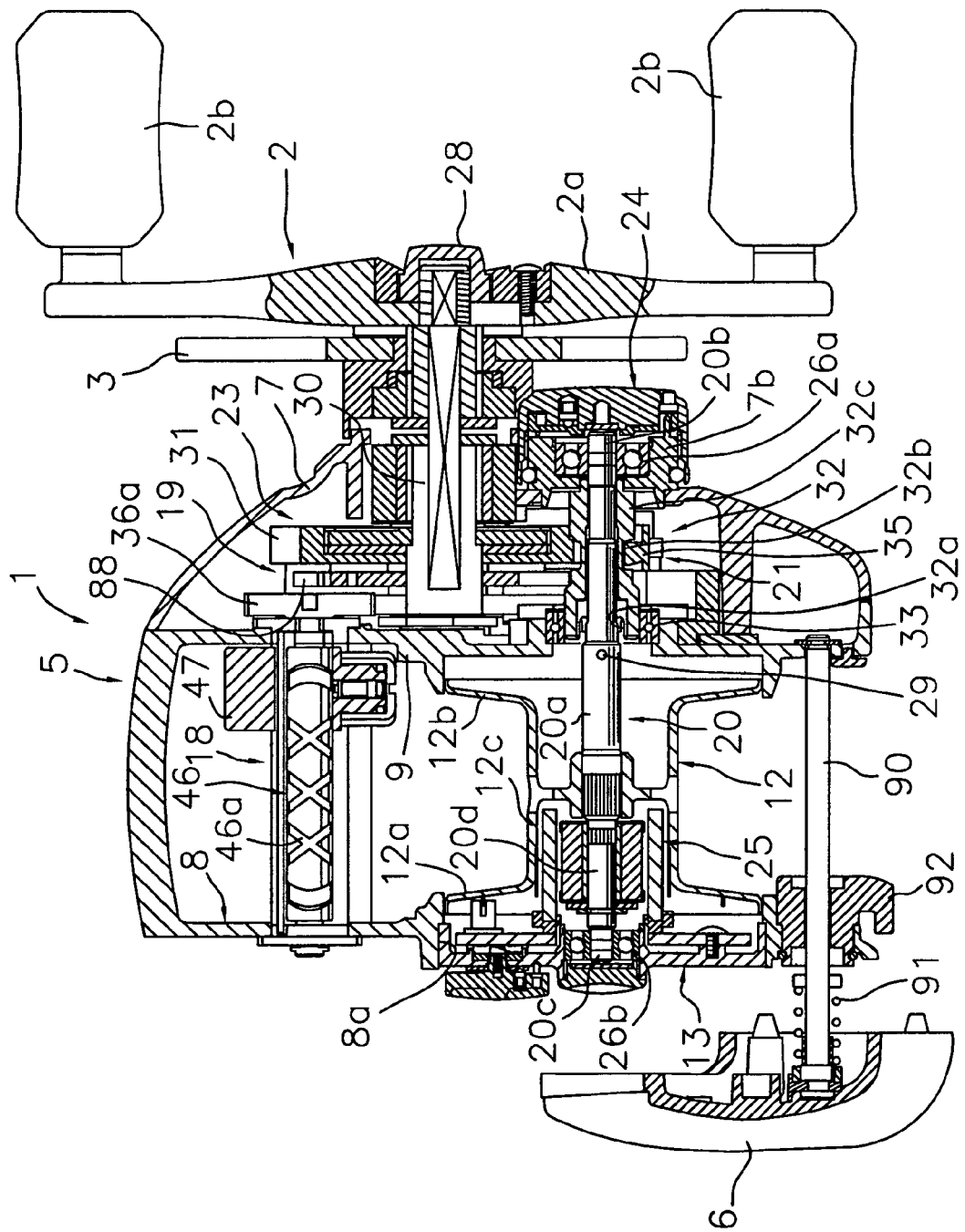
FIG. 2 is a partial cross-section view of the dual bearing reel equipped with the spool braking device of FIG. 1 with a first side cover opened in accordance with a first embodiment of the present invention.

Referring to FIGS. 1 and 2, the handle 2 is of the double-handle type. The handle 2 has a plate-shaped arm portion 2a and knobs 2b that are rotatably mounted to both ends of the arm portion 2a. As shown in FIG. 2, the arm portion 2a is non-rotatably mounted to a tip of a handle shaft 30. The arm portion 2a is fastened to the handle shaft 30 by a nut 28.

The reel unit 1 is made of a metal such as an aluminum alloy, a magnesium alloy, or the like, for example. The reel unit 1 includes a frame 5, a first side cover 6 and a second side cover 7. The first and second side covers 6 and 7 are mounted to respective sides of the frame 5. A spool 12 for winding fishing line is rotatably mounted to an interior of the reel unit 1 via a spool shaft 20. The handle 2 rotates the spool 12.

As shown in FIGS. 1 and 2, the spool 12, a clutch lever 17 and a level wind mechanism 18 are disposed inside the frame 5. The clutch lever 17 functions as a thumb rest when thumbing the fishing line. The level wind mechanism 18 serves to uniformly wind fishing line around the spool 12. In addition, a gear mechanism 19, a clutch mechanism 21, a clutch controlling mechanism 22, a drag mechanism 23 and a casting controlling mechanism 24 are disposed between the frame 5 and the second side cover 7. The gear mechanism 19 transmits rotational force from the handle 2 to the spool 12 and the level wind mechanism 18. The clutch controlling mechanism 22 controls the clutch mechanism 21 in accordance with the operation of the clutch lever 17. The drag mechanism 23 brakes the spool 12. The casting controlling mechanism 24 serves to adjust the resistance that occurs when the spool 12 rotates. In addition, an electrically controlled spool braking mechanism (an example of the spool braking device) 25 serves to prevent backlash when casting fishing line. The spool braking mechanism 25 is disposed between the frame 5 and the first side cover 6.

The frame 5 includes first and second side plates 8 and 9 disposed in opposing positions with a predetermined space therebetween. A plurality of connectors (not shown) unitarily connect the first and second side plates 8 and 9. The first side plate 8 has a circular opening 8a having a step. The circular opening 8a is formed slightly above a center of the side plate 8. A spool support portion 13 that forms a portion of the reel unit 1 is screwed into the opening 8a. In addition, a rod attachment leg 4 (see FIG. 4) for attaching the reel unit 1 to a fishing rod is unitarily formed with a lower portion of the frame 5.

Figure 3:
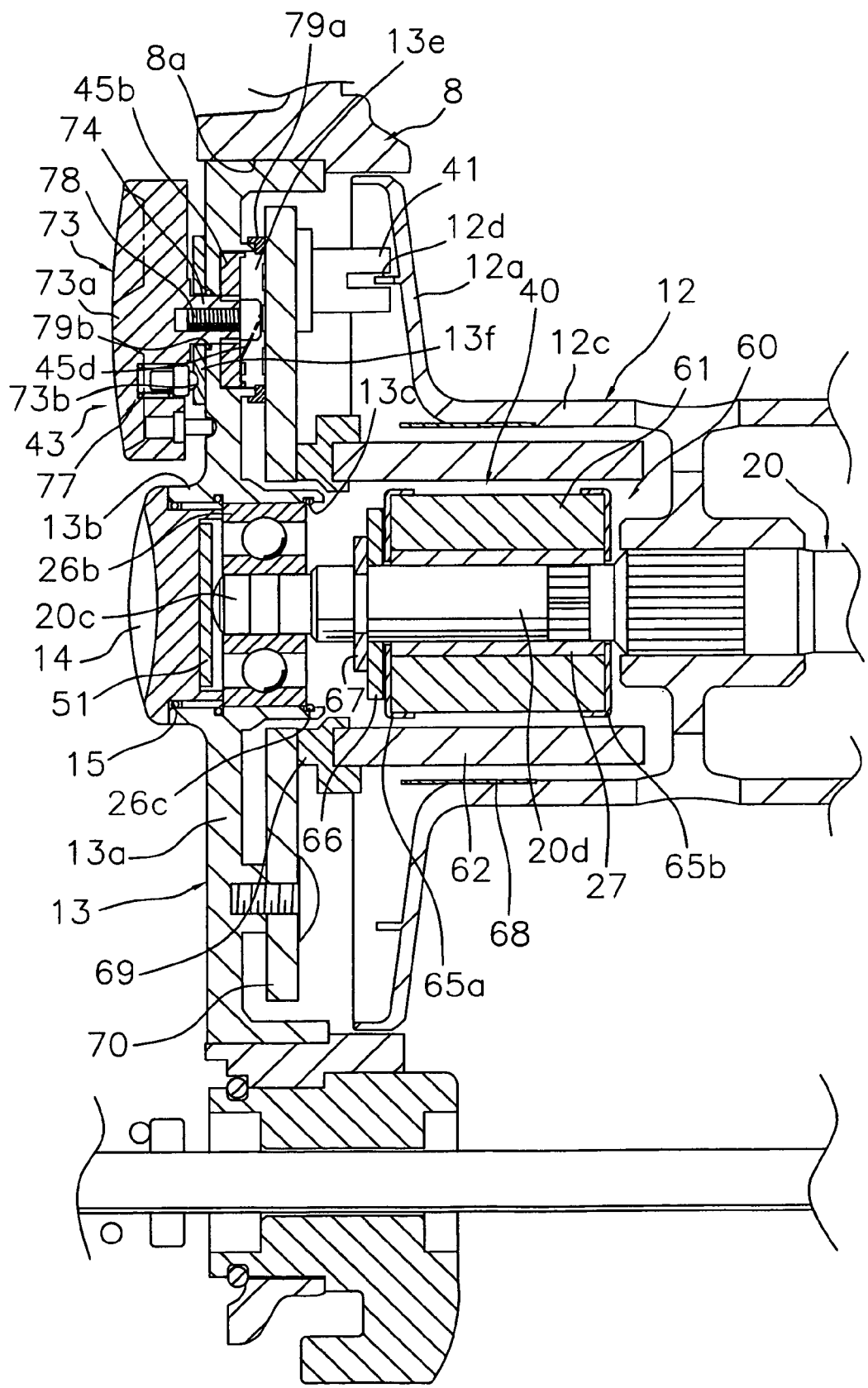
FIG. 3 is an enlarged cross-section view of the spool braking device of FIG. 2 in accordance with a first embodiment of the present invention.
Figure 5:
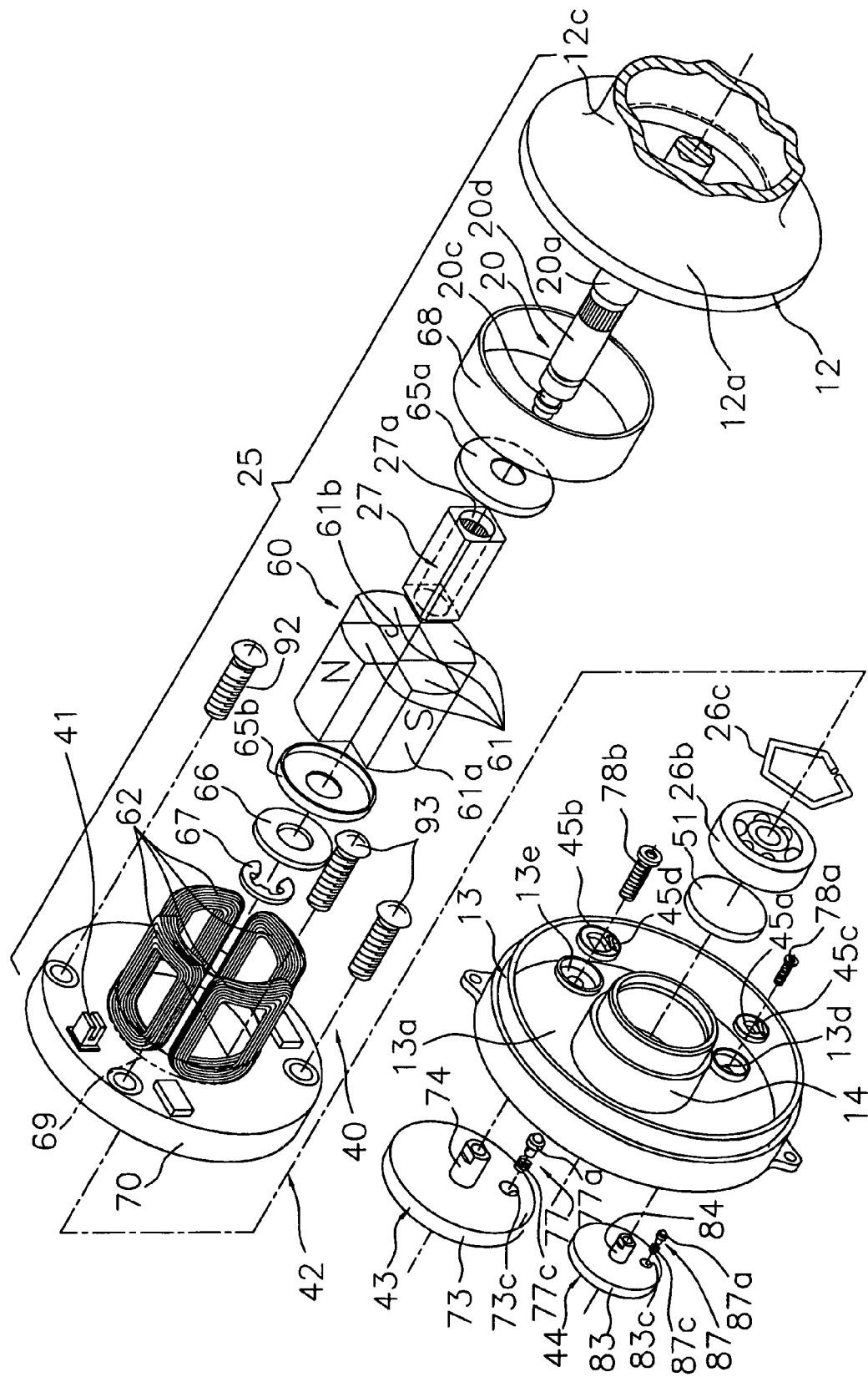
FIG. 5 is an exploded oblique view of the spool braking device in accordance with the first embodiment of the present invention.

Referring to FIGS. 2, 3 and 5, the spool support portion 13 is a flat and approximately closed end cylindrical member that is detachably/reattachably mounted to the opening 8a. The spool support portion 13 has a wall portion 13a and a tubular bearing accommodation portion 13b. The bearing accommodation portion 13b projects inward and outward. The bearing accommodation portion 13b is unitarily formed at a central portion of the wall portion 13a. A bearing 26b rotatably supports one end of the spool shaft 20. The bearing 26b is disposed on an inner peripheral surface of the bearing accommodation portion 13b. In addition, a cap member 14 is detachably/reattachably mounted to a bottom portion (left end portion in FIG. 3) of the bearing accommodation portion 13b. A friction plate 51 of the casting controlling mechanism 24 is mounted to the cap member 14. The cap member 14 is screwed into the inner peripheral surface of the bearing accommodation portion 13b. The space between the inner peripheral surface of the bearing accommodation portion 13b and the cap member 14 is sealed by an O-ring 15. The bearing 26b is anchored to the bearing accommodation portion 13b by a retaining member 26c formed by bending a metal wire into a polygon (e.g., a pentagon). A corner of the retaining member 26c is interlocked with an annular groove formed on the inner peripheral surface of the bearing accommodation portion 13b. With the cap member 14 being mounted to the bearing accommodation portion 13b, it is possible to mount the bearing 26b to the bearing accommodation portion 13b from the outside (i.e., left side in FIG. 3) of the reel unit 1 when the cap member 14 is detached from the bearing accommodation portion 13b. Thus, detachment and attachment of the bearing 26b from/to the bearing accommodation portion 13b as well as lubricating the bearing 26b is facilitated.

Figure 4:
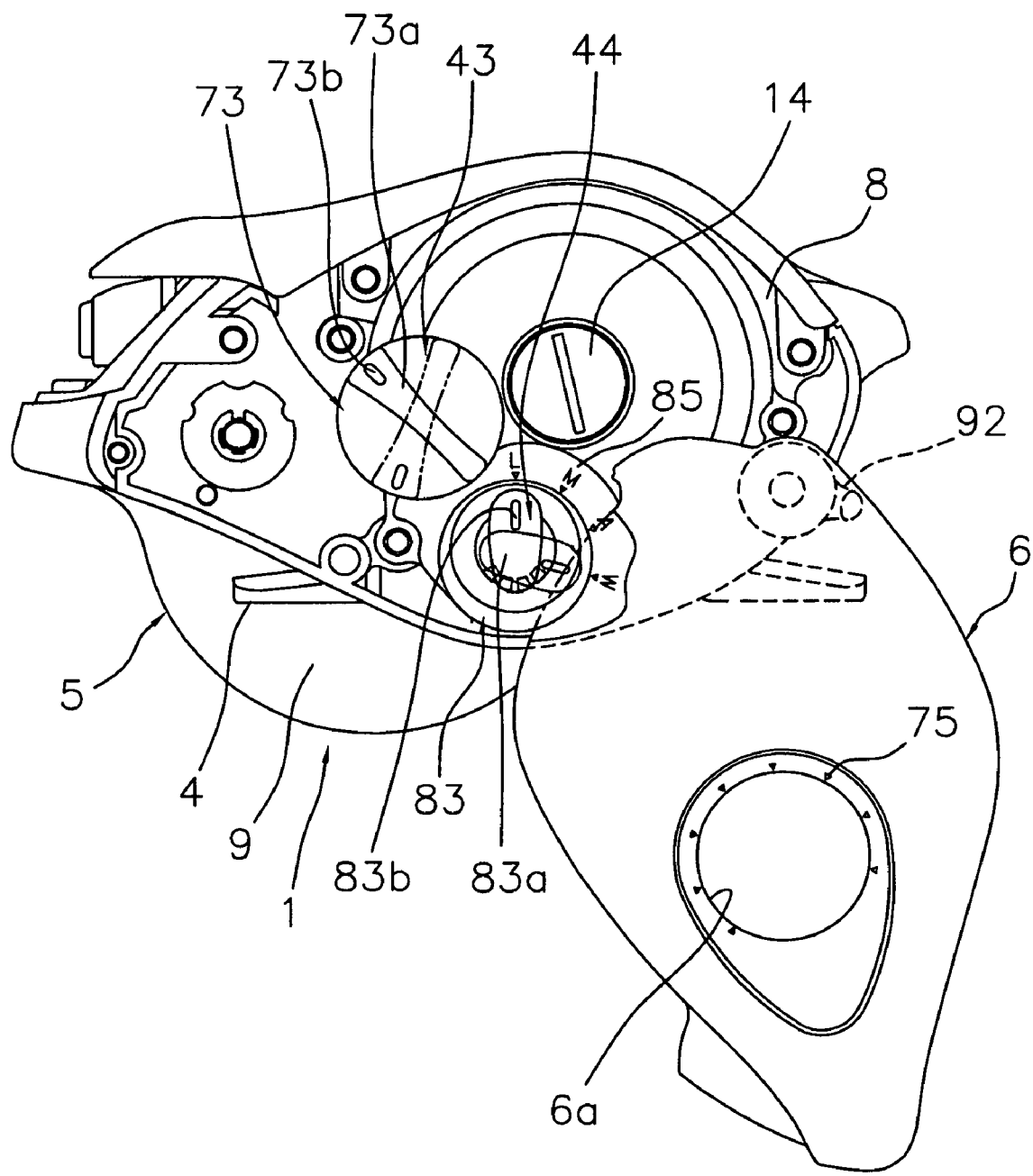
FIG. 4 is a lateral view of the dual bearing reel equipped with the spool braking device of FIGS. 1 and 2 with the first side cover opened in accordance with the first embodiment of the present invention.

As shown in FIGS. 2 and 4, the first side cover 6 is mounted to the first side plate 8. The first side cover 6 is configured to be opened and closed by a pivot shaft 90 rotatably supported by the first and second side plates 8 and 9 in a lower rear portion of the frame 5 so that the first side cover 6 is movable within a predetermined range in an axial direction. A spring member 91 urges the pivot shaft 90 outward in the axial direction. The first side cover 6 is fixed to a tip of the pivot shaft 90. An operating lever 92 is used for a rotational operation to open or close the first side cover 6. The operating lever 92 rotates around the pivot shaft 90 and is rotatably mounted to a rear portion of the frame 5. The pivot shaft 90 passes through a center of the operating lever 92. The first side cover 6 is opened by the rotational operation of the operating lever 92 in one direction. In addition, if the operating lever 92 is rotated in the other direction while the first side cover 6 is closed, the first side cover 6 is locked in a closed state. The first side cover 6 forms an opening portion 6a for exposing an operating member. As shown in FIG. 2, the second side cover 7 is disposed on a handle side of the frame 5. The second side cover is secured to the frame 5 by a screw, for instance.

As shown in FIG. 2, the spool 12 has saucer-shaped first and second flange portions 12a and 12b and a tubular bobbin trunk 12c between the first and second flange portions 12a and 12b. Referring to FIGS. 2 and 3, an outer peripheral surface of the first flange portion 12a is disposed in an inner peripheral side of the opening 8a. This serves to prevent line snags. The spool shaft 20 passes through an inner peripheral side of the bobbin trunk 12c. The spool 12 is non-rotatably fixed to the spool shaft 20 by, for example, serration coupling. It will be apparent to one of ordinary skill in the art from this disclosure that the method of fixation is not limited to the serration coupling, and a variety of coupling methods such as key coupling, spline coupling, or the like, can be employed. The spool 12 further has a slit ring 12d that is unitarily formed on an outer peripheral surface of the first flange portion 12a. The slit ring 12d functions as a detecting element and comprises a plurality of slits (not shown) formed in the circumferential direction at predetermined intervals.

The spool shaft 20 is made of a non-magnetic metal such as SUS 304 or the like, for example. The spool shaft 20 passes through the side plate 9 and extends outward from the second side cover 7. An end of the spool shaft 20 that extends outward from the second side cover 7 is rotatably supported by a bearing 26a that is mounted to an inner peripheral surface of a boss 7b mounted on the second side cover 7. The bearing 26a is anchored by a retaining member 26d with the same configuration as that of the retaining member 26c (see FIG. 6). In addition, the other end of the spool shaft 20 is rotatably supported by the bearing 26b as described above. The bearings 26a and 26b are, for example, made of SUS 440C that has been coated with a special corrosion resistant film. The spool shaft 20 includes a large diameter portion 20a and small diameter portions 20b and 20c. The large diameter portion 20a is formed in the center of the spool shaft 20. The small diameter portions 20b and 20c are supported by the bearings 26a and 26b, respectively. The small diameter portions 20b and 20c are formed on respective ends of the spool shaft 20.

Furthermore, as shown in FIG. 3, the spool shaft 20 further includes a magnet mounting portion 20d that is formed between the small diameter portion 20c and the large diameter portion 20a (on the left side of FIG. 3). The magnet mounting portion 20d has an outer diameter that is larger than that of the small diameter portion 20c and smaller than that of the large diameter portion 20a. A magnet retaining portion 27 is non-rotatably fixed to the magnet mounting portion 20d, for example, by the serration coupling. The magnet retaining portion 27 includes a magnetic material formed by performing electroless nickel plating with respect to a surface of an iron material such as SUM (extruded and cut). As shown in FIG. 5, the magnet retaining portion 27 is a rectangular member with a square shaped cross-section. The magnet retaining portion 27 forms a through hole 27a in a center of the magnet retaining portion 27. The magnet mounting portion 20d passes through the through hole 27a. It will be apparent to one of ordinary skill in the art from this disclosure that the method of fixing the magnet retaining portion 27 is not limited to the serration coupling, and a variety of coupling methods such as key coupling, spline coupling, or the like, can be employed.

As shown in FIG. 2, an engagement pin 29 that forms a part of the clutch mechanism 21 is fixed at an end of the large diameter portion 20a of the spool shaft 20 that is disposed at a pass through portion of the side plate 9. The engagement pin 29 passes through the large diameter portion 20a in a radial direction and both ends of the engagement pin 29 project outward from the large diameter portion 20a in the radial direction.

As shown in FIG. 1, the clutch lever 17 is a rear portion located between the first and second side plates 8 and 9, and disposed to the rear of the spool 12. The clutch lever 17 slides vertically between the first and second side plates 8 and 9. An engagement shaft (not shown) is unitarily formed with the clutch lever 17 on a side of the clutch lever 17 where the handle is mounted, and passes through the second side plate 9. The engagement shaft is engaged with the clutch controlling mechanism 22.

As shown in FIG. 2, the level wind mechanism 18 is disposed above the spool 12. The level wind mechanism 18 is rotatably supported by the first and second side plates 8 and 9. The level wind mechanism 18 includes a worm shaft 46 on an outer peripheral surface of which intersecting helical grooves 46*a* are formed, and a fishing line guide portion 47. The fishing line guide portion 47 reciprocates back and forth on the worm shaft 46 in the spool shaft direction and guides the fishing line. The worm shaft 46 rotates in association with the gear mechanism 19. The fishing line guide portion 47 reciprocates (in the left and right directions of FIG. 2) by rotation of the worm shaft 46 to uniformly guide fishing line to the spool 12.

The gear mechanism 19 includes the handle shaft 30, a main gear 31 and a tubular pinion gear 32. The main gear 31 is fixed to the handle shaft 30. The tubular pinion gear 32 meshes with the main gear 31. The handle shaft 30 is rotatably mounted on the side plate 9 and the second side cover 7. The handle shaft 30 is prohibited from rotating in the line releasing direction (i.e., reverse direction) by a one-way clutch 88. The main gear 31 is rotatably mounted to the handle shaft 30. The main gear 31 is coupled to the handle shaft 30 via the drag mechanism 23.

The pinion gear 32 extends from outside of the second side plate 9 to the inside thereof. The spool shaft 20 passes through a center of the pinion gear 32. The pinion gear 32 is movably mounted on the spool shaft 20 in the axial direction. An end of the pinion gear 32 (the left end in FIG. 2) is rotatably and movably supported in the axial direction on the second side plate 9 by a bearing 33. The pinion gear 32 includes a meshing groove 32*a*, a constricted portion 32*b* and a gear portion 32*c*. The clutch mechanism 21 is comprised of the meshing groove 32*a* and the engagement pin 29. The meshing groove 32*a* meshes with the engagement pin 29. The meshing groove 32*a* is formed at the end of the pinion gear 32 that is supported by the bearing 33 (left end of the pinion gear 32 in FIG. 2). The constricted portion 32*b* is formed in an intermediate portion of the pinion gear 32. The gear portion 32*c* meshes with the main gear 31. The gear portion 32*c* is formed on an end of the pinion gear 32 adjacent the bearing 26*a* (right end portion of the pinion gear 32 in FIG. 2).

The clutch controlling mechanism 22 includes a clutch yoke 35 that engages with the constricted portion 32*b* of the pinion gear 32 and moves the pinion gear 32 along the spool shaft direction. The clutch yoke 35 moves in the spool shaft direction in association with movement of the clutch lever 17. The clutch controlling mechanism 22 further includes a clutch return mechanism (not shown) which turns the clutch mechanism 21 when the spool 12 rotates in the line winding direction.

Figure 6:
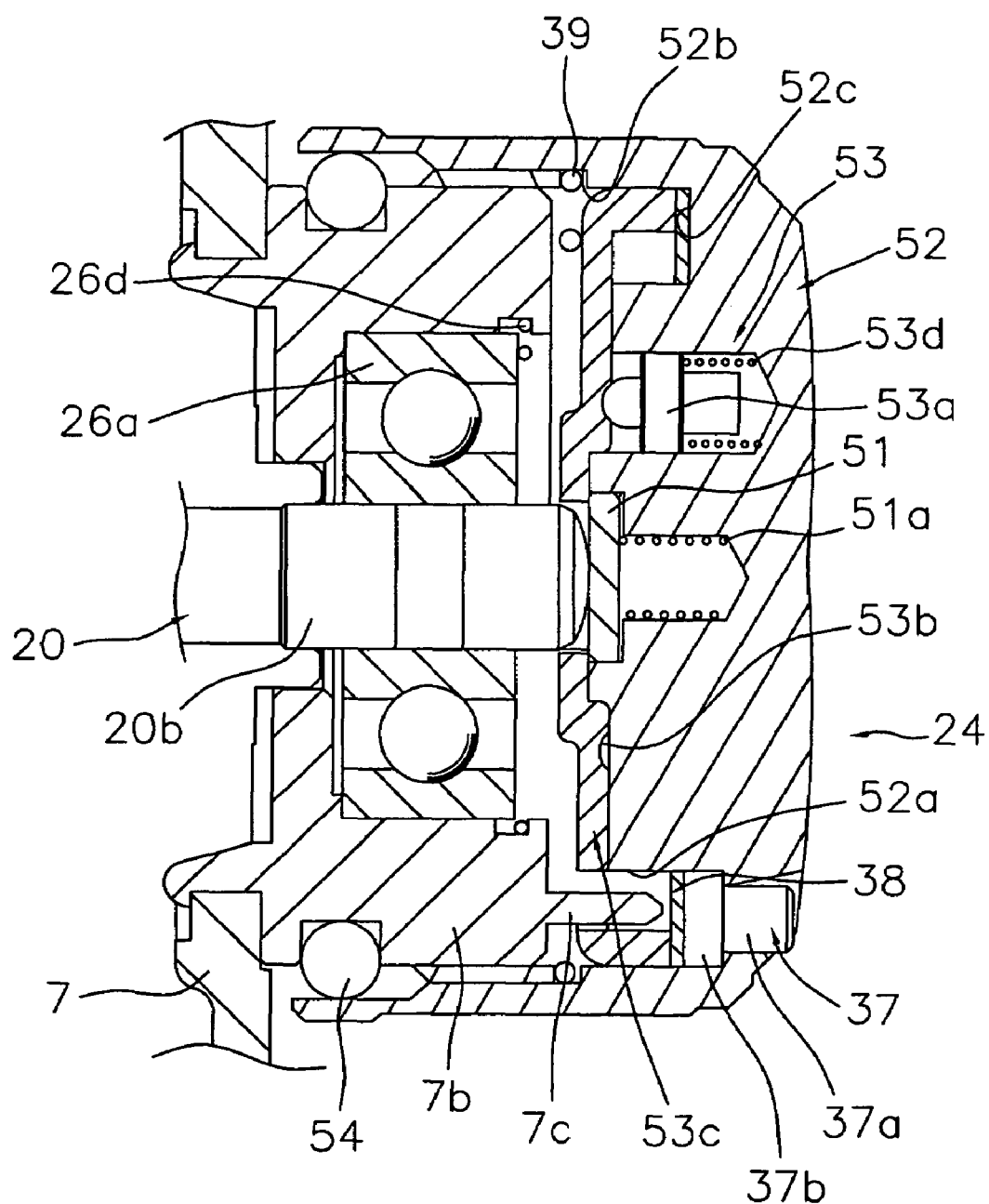
FIG. 6 is a cross-section view of a casting controlling mechanism of the dual bearing reel in accordance with the first embodiment of the present invention.

As shown in FIGS. 2, 3 and 6, the casting controlling mechanism 24 includes a plurality of friction plates 51, a braking cap 52 and a sounding mechanism 53. The friction plates 51 sandwich both ends of the spool shaft 20. The braking cap 52 adjusts a force of the friction plates 51 to sandwich the spool shaft 20. The sounding mechanism 53 makes a sound by the rotation of the braking cap 52. The friction plate 51 adjacent the small diameter portion 21*c* is mounted to an interior of the cap member 14. The friction plate 51 adjacent the small diameter portion 20*b* is mounted to an interior of the braking cap 52, and is urged to the inside (i.e., left side of FIG. 6) by a coil spring 51*a*. The braking cap 52 is screwed together with the outer peripheral surface of the boss 7*b*. An O-ring 54 is attached between the braking cap 52 and the outer peripheral surface of the boss 7*b* in order to prevent the braking cap 52 from rotating and prevent foreign matter such as liquids or the like from entering the inside of the casting controlling mechanism 24.

Referring to FIG. 6, the sounding mechanism 53 includes a sound producing pin 53*a*, a plurality of sound producing recesses 53*b*, a sound producing member 53*c* and a coil spring 53*d*. The sound producing recesses 53*b* are formed in the circumferential direction at predetermined intervals in the sound producing member 53*c*. The sound producing pin 53*a* is mounted to the braking cap 52 so that it can extend toward and retract away from the sound producing recesses 53*b*. The sound producing pin 53*a* is urged toward the sound producing recesses 53*b* by the coil spring 53*d*. The sound producing pin 53*a* strikes against the sound producing member 53*c* through the sound producing recesses 53*b*. The sound producing member 53*c* is rotatably mounted to the braking cap 52 and non-rotatably engaged with an interlocking projection 7*c* formed in the boss 7*b*. Therefore, the sound producing member 53*c* relatively rotates with the sound producing pin 53*a*. An annular retaining groove 52*b* is formed on the inner peripheral surface of the braking cap 52. The sound producing member 53*c* is retained on the braking cap 52 by a polygonal (e.g., hexagonal) wire retaining member 39. The retaining member 39 is mounted to the retaining groove 52*b* formed on the inner peripheral surface of the braking cap 52. Because of this, even if the braking cap 52 is removed from the boss 7*b*, the sound producing pin 53*a* does not drop. Accordingly, it is possible to prevent loss of the sound producing pin 53*a*. In addition, the inner peripheral portion of the sound producing member 53*c* is located inside the outer peripheral portion of the friction plate 51 on the right side. Therefore, it is possible to prevent the friction plate 51 on the right side urged by the coil spring 51*a* from dropping.

The braking cap 52 forms a stepped hole 52*a* that passes through the braking cap 52 parallel to the spool shaft 20. A diameter of a portion of the stepped hole 52*a* that is on a handle side of the braking cap 52 is smaller than a diameter of an inside portion of the stepped hole 52*a*. An indicating member 37 is mounted to the stepped hole 52*a*. The indicating member 37 indicates a degree of control of the casting controlling mechanism 24 by the rotational position. The indicating member 37 is a stepped columnar member made of a material having a translucent red ruby appearance. The indicating member 37 includes a small diameter portion 37*a* on a handle side and a large diameter portion 37*b* on an inner side. The small diameter portion 37*a* is exposed to the outside. A ring shaped reflective member 38 is disposed on an inner surface of the large diameter portion 37*b*. The reflective member 38 is fixed to an annular recess 52*c* formed in the braking cap 52 by a suitable fixing device such as adhesive. Outside light that transmits through the indicating member 37 is reflected by the reflective member 38 thereby causing the indicating member 37 to shine. Because of this, the rotational position of the indicating member 37 is easily seen and the degree of control of the casting controlling mechanism 24 is instantly recognized.

As shown in FIGS. 3-5 and 7, the spool braking mechanism 25 includes a spool braking unit 40 that is disposed in the spool 12 and the reel unit 1, an adjustment knob (an example of a second operating member) 43 that is able to be operated to be positioned in a plurality (e.g., eight) of operating positions (an example of second operating positions), the setting knob (an example of the first operating member) 44 that is able to be operated to be positioned in a plurality (e.g., four)

of operating positions (an example of the first operating positions), and the spool controlling unit 42 that electrically controls the spool braking unit 40 according to the operating positions of the adjustment knob 43 and the setting knob 44. In addition, the spool braking mechanism 25 further comprises the rotational speed sensor 41 for detecting tension applied to fishing line. The spool controlling unit 42 has a circuit board 70.

The spool braking unit 40 includes a rotor 60 that has a plurality of magnets 61, a plurality of coils 62 and a switch element 63. Four magnets 61, for example are disposed side by side around the spool shaft 20 in the rotational direction. Four coils 62, for example, are disposed to face each other on outer peripheral sides of the rotor 60. The coils 62 are serially connected to each other. Both ends of the serially connected coils 62 are connected to the switch element 63. The spool braking unit 40 brakes the spool 12 by turning on or off the flow of electricity generated by relative rotation between the magnets 61 and the coils 62 using the switch element 63. The braking force generated by the spool braking unit 40 will increase in accordance with the length of time the switch element 63 is on.

It will be apparent to one of ordinary skill in the art from this disclosure that the coils 62 may be disposed on the spool shaft 20 and the magnets 61 may be disposed on the spool 12. In addition, magnets may be disposed on a flange portion of the spool 12 and the coils 62 may be disposed so that they face magnets 61 disposed on the circuit board 70. In this case, the coils 62 may be formed in a flat and thin shape.

Referring to FIG. 5, the four magnets 61 of the rotor 60 are disposed side by side in the circumferential direction. The polarities of the magnets 61 are interchangeably different from each other. As shown in FIG. 5, the magnets 61 are members with approximately the same length as that of the magnet retaining portion 27. The magnets 61 have outer surfaces 61a that are arc-shaped in cross-section and inner surfaces 61b that are planar. The inner surfaces 61b are disposed to contact the outer peripheral surfaces of the magnet retaining portion 27 of the spool shaft 20. Both ends of the magnets 61 are interposed between disk-shaped and plate-shaped cap members 65a and 65b that are made of a non-magnetic metal such as SUS 304 or the like. The disk-shaped and plate-shaped cap members 65a and 65b are non-rotatably mounted to the magnet retaining portion 27 with respect to the spool shaft 20. Therefore, the magnets 61 are easily assembled onto the spool shaft 20 without weakening the magnetic force of the magnets 61. In addition, the comparative strength of the magnets 61 after assembly is able to be increased.

End surfaces of the magnets 61 nearest the bearing 26b (left side of FIG. 3) are spaced a distance of approximately 2.5 mm or greater, for example, from the bearing 26b. The cap member 65b adjacent the large diameter portion 20a (right side of FIG. 3) is interposed between the large diameter portion 20a of the spool shaft 20 and the magnet retaining portion 27. The step between the large diameter portion 20a and the magnet mounting portion 20d limits the inward movement of the cap member 65b.

A washer member 66 is mounted to the disk-shaped cap member 65b. The washer member 66 is made from a magnetic material formed by performing electroless nickel plating with respect to the surface of an iron material such as SPCC (plate) or the like. The washer member 66 is retained by an E-shaped retaining ring 67, for example, that is mounted to the spool shaft 20. The washer member 66 has a thickness that is approximately greater than or equal to 0.5 mm and less than or equal to 2 mm, for example. An outer diameter of the washer member 66 is approximately greater than or equal to 60% and less than or equal to 120% of the outer diameter of the bearing 26b, for example. The magnetic washer member 66 prevents the bearing 26b disposed near the magnets 61 to become easily magnetized. Because of this, it will be difficult for the magnets 61 to have an impact on the rotational ability of the spool 12 in a free rotation even if the bearing 26b is disposed near the magnets 61. In addition, it will also be difficult for the bearing 26b to become magnetized because the distance between the magnets 61 and the bearing 26b is approximately 2.5 mm or greater, for example.

Referring to FIGS. 3 and 4, a sleeve 68 is disposed on an inner peripheral surface of the bobbin trunk 12c. The sleeve 68 has an inner peripheral surface that faces the magnets 61. The sleeve 68 is made from a magnetic material formed by performing electroless nickel plating with respect to the surface of an iron material such as SUM (extruded and cut material). The sleeve 68 is fixed to the inner peripheral surface of the bobbin trunk 12c by a suitable fixing mechanism such as press fitting or adhesive. With this magnetic sleeve 68 disposed to face the magnets 61, magnetic flux from the magnets 61 converges on and passes through the coils 62. Therefore, electrical generation and brake efficiency are enhanced.

The coils 62 are of the coreless type, which serve to prevent cogging and make the rotation of the spool 12 smooth. Furthermore, a yoke is not provided. The coils 62 are wound into approximately rectangular shapes so that the wrapped core wires are disposed inside the magnetic fields of the magnets 61. The coils 62 are curved into arc-shapes along the rotational direction of the spool 12 that are substantially concentric with respect to the spool shaft axis so that the distance between the outer surfaces 61a of the magnets 61 and the coils 62 is approximately constant. Because of this, the gap between the coils 62 and the magnets 61 during rotation can be constantly maintained. The four coils 62 are, for example, held in place by a ring-shaped coil holder 69 made of a synthetic resin. The surface of the coils 62 are covered with an insulating film such as a varnish or the like. The coil holder 69 is fixed to the circuit board 70 that forms a part of the spool controlling unit 42. Note that in FIG. 5, the coil holder 69 is illustrated with dashed-two dotted lines in order to mainly draw the coils 62. Thus, the four coils 62 are easily mounted to the circuit board 70 because the coils 62 are mounted on the coil holder 69 made of a synthetic resin. The magnetic flux from the magnets 61 will not be disturbed because the coil holder 69 is made from a synthetic resin.

The switch element 63 includes, for example, two parallel connected FETs (field effect transistors) that can switch on and off at a high speed. The serially connected coils 62 are connected to each drain terminal of the FETs. The switch element 63 is mounted to a rear surface of the circuit board 70 (i.e., the opposite surface from the front surface facing the flange portion 12a).

The rotational speed sensor 41 employs, for example, a light emitting/receiving type electro-optical sensor in which a light emitting portion and a light receiving portion are disposed to face each other. The electro-optical sensor is formed in a C-shape when seen from the lateral side. The electro-optical sensor is disposed on a front surface of the circuit board 70 that faces the flange portion 12a of the spool 12. The slit ring 12d is disposed between the light emitting portion and the light receiving portion of the rotational speed sensor 41. The rotational speed of the spool 12 is detected with signals from the rotational speed sensor 41. Tension applied to the fishing line is then detected with the rotational speed.

The adjustment knob 43 is provided to adjust the strength of each of the braking modes operating with braking patterns shown in FIGS. 8 to 11 in eight levels. The braking patterns shown in FIGS. 8 to 11 are hereinafter explained in detail. The braking patterns are basically configured based on nylon fishing line. The braking patterns are set to have eight levels and modes are set to have four types. However, this is an example, and these levels and types can be set to any suitable value.

As shown in FIGS. 3-5, the adjustment knob 43 is rotatably mounted to the spool support portion 13 that forms a part of the reel unit 1. The adjustment knob 43 includes, for example, a disk-shaped adjustment knob unit 73 and an adjustment knob rotation shaft 74. The adjustment knob unit 73 is made of a synthetic resin. The rotation shaft 74 is positioned in a center of the adjustment knob unit 73 and passes through the spool support portion 13. The rotation shaft 74 is unitarily formed with the adjustment knob unit 73. The rotation shaft 74 and a second rotational position discrimination sensor 45b are rotatably mounted to the spool support portion 13 by a bolt member 78b. The adjustment knob unit 73 includes an adjustment knob portion 73a, an adjustment knob indicator 73b and an adjustment knob recess 73c. The adjustment knob recess 73c is formed on a backside of the adjustment knob unit 73. The adjustment knob portion 73a extends outward and is formed on an outer surface of the adjustment knob unit 73 that faces the opening 6a. The adjustment knob portion 73a is exposed through the opening 6a to the outside. The perimeter of the adjustment knob portion 73a is concave in shape, which makes the operation of the adjustment knob 43 easier.

The adjustment knob indicator 73b is formed in one end of the adjustment knob portion 73a and is slightly concave. A plurality of marks 75, eight for example, indicate strength levels of the braking force. The marks 75 are formed at regular intervals on the first side cover 6 around the opening portion 6a. The marks 75 are formed by printing, providing stickers, or the like. The strength of the braking patterns or braking force can be set to have eight levels by positioning the adjustment knob indicator 73b to align with any of the marks 75 by rotation of the adjustment knob 43. In addition, the second rotational position discrimination sensor 45b is non-rotatably mounted to the backside of the adjustment knob unit 73. The second rotational position discrimination sensor 45b serves to detect which operating position is selected from the eight level operating positions of the adjustment knob 43. The second rotational position discrimination sensor 45b has a brush member 45d made of conductive material. The brush member 45d contacts and shunts one of eight discrimination patterns (not shown) formed on the circuit board 70. A control unit 55 detects a rotational position of the adjustment knob 43 based on which discrimination pattern is shunted by the brush member 45d. A columnar second accommodation space 13e for accommodating the second rotational position discrimination sensor 45 is formed in the inside wall portion of the spool support portion 13. A seal member 79a is mounted between the second accommodation space 13e and the circuit board 70. The seal member 79a prevents liquids from entering into the interior of the spool braking mechanism 25. In addition, an O-ring 79b is also mounted between the rotation shaft 74 and a pass-through portion of the spool support portion 13. The O-ring 79b prevents liquids from entering into the interior of the spool braking mechanism 25.

An adjustment knob positioning mechanism 77 is provided between the adjustment knob unit 73 and the outer surface of the wall portion 13a of the spool support portion 13. The adjustment knob positioning mechanism 77 positions the adjustment knob 43 at operating positions of eight levels, and generates sounds when the adjustment knob 43 is rotated. As shown in FIG. 5, the adjustment knob positioning mechanism 77 includes a positioning pin 77a, a plurality of positioning holes 77b and an urging member 77c. The adjustment knob positioning pin 77a is mounted in the adjustment knob recess 73c. The positioning holes 77b, eight for example, engage with a tip of the positioning pin 77a. The urging member 77c urges the positioning pin 77a toward the positioning holes 77b. The positioning pin 77a is a rod shaped member that includes a small diameter head portion, a brim portion having a diameter that is larger than that of the head portion, and a small diameter shaft portion. The head portion is formed into a hemispherical shape. The positioning pin 77a is mounted in the adjustment knob recess 73c so that the positioning pin 77a can both project outward and retract inward. The positioning holes 77b are formed at predetermined intervals in the circumferential direction in a fan-shaped auxiliary member 13f fixed around the through-hole in the outer surface of the wall portion 13a of the spool support portion 13. The positioning holes 77b are formed so that the adjustment knob indicator 73b will align with any of the marks 75.

The setting knob 44 is provided for setting braking modes depending on casting conditions, respectively. As shown in FIGS. 4 and 5, the setting knob 44 is rotatably mounted to the spool support portion 13 at a remote position from the adjustment knob 43. It is not necessary to frequently operate the setting knob 44 and thus operation thereof is regulated. Specifically, in order to regulate operation of the setting knob 44, the setting knob 44 is disposed inside the first side cover 6 and is not exposed to the outside. Thus, the first side cover 6 functions as an operation regulating device and is required to be opened when the setting knob 44 is operated. Because the first side cover 6 is required to be opened to operate the setting knob 44, it is possible to prevent the setting knob 44 from being moved by mistake. Accordingly, it will be difficult to cause a setting change of an optimal braking mode by mistake.

The setting knob 44 includes, for example, a disk-shaped setting knob unit 83 and a setting knob rotation shaft 84. The setting knob rotation shaft 84 is positioned in a center of the setting knob unit 83 and passes through the spool support portion 13. The setting knob unit 83 is made of a synthetic resin. The setting knob rotation shaft 84 is unitarily formed with the setting knob unit 83. The setting knob rotation shaft 84 and a first rotational position discrimination sensor 45a are rotatably mounted to the spool support portion 13 by a bolt member 78a. The setting knob unit 83 includes a setting knob portion 83a, a setting knob indicator 83b and a setting knob recess 83c. The setting knob recess 83c is formed on a backside of the setting knob unit 83. The setting knob portion 83a extends outward and is formed on an outer surface of the adjustment knob unit 73.

The setting knob indicator 83b is formed in one end of the setting knob portion 83a and is slightly concave. A plurality of characters (e.g. L, M, A, W) 85 indicating braking modes according to the configured braking patterns are formed at regular intervals on a portion of the side plate 8 that surrounds the setting knob indicator 83b by a suitable forming method such as printing, providing stickers, or the like. Any of the four braking modes according to casting conditions can be selected by aligning the setting knob indicator 83b with any of the characters 85 by rotating the setting knob 44. In addition, the first rotational position discrimination sensor 45a is non-rotatably mounted to the backside of the setting knob unit 83. The first rotational position discrimination sensor 45a serves to detect which operating position is selected from the four operating positions of the setting knob 44. The first rotational position discrimination sensor 45a has a brush member 45c made of conductive material. The brush member 45c contacts and shunts one of four discrimination patterns (not shown) formed on the circuit board 70. The control unit 55 detects a rotational position of the setting knob 44 based on which discrimination pattern is shunted by the brush member 45c. Note that a columnar first accommodation space 13d for accommodating the first rotational position discrimination sensor 45a is formed in the inside wall portion of the spool support portion 13. A seal member (not shown) is mounted between the first accommodation space 13d and the circuit board 70. The seal member prevents liquids from entering into the interior of the spool braking mechanism 25. In addition, an O-ring (not shown) is also mounted between the setting knob rotation shaft 84 and a pass-through portion of the spool support portion 13. The O-ring prevents liquids from entering into the interior of the spool braking mechanism 25.

A setting knob positioning mechanism 87 is provided between the setting knob unit 83 and the outer surface of the wall portion 13a of the spool support portion 13. The positioning mechanism 87 positions the setting knob 44 at operating positions of four levels, and generates sounds when the setting knob 44 is rotated. As shown in FIG. 5, the setting knob positioning mechanism 87 includes a setting knob positioning pin 87a, a plurality of setting knob positioning holes (not shown) and a setting knob urging member 87c. The setting knob urging member urges the setting knob positioning pin 87a toward the setting knob positioning holes. The setting knob positioning pin 87a is mounted in the setting knob recess 83c. The setting knob positioning holes, for example, eight setting knob positioning holes engage with a tip of the setting knob positioning pin 87a. The setting knob positioning pin 87a is a rod shaped member that includes a small diameter head portion, a brim portion having a diameter that is larger than that of the head portion, and a small diameter shaft portion. The head portion is formed into a hemispherical shape. The positioning holes are formed at predetermined intervals in the circumferential direction in a portion of the outer surface of the wall portion 13a of the spool support portion 13 that surrounds a through-hole formed therein. The positioning holes are formed so that the knob indicator 83b will align with any of the four characters 85.

The spool controlling unit 42 includes the circuit board 70 and the control unit 55. The circuit board 70 is mounted to the outer wall surface of the spool support portion 13 that faces the flange portion 12a of the spool 12. The control unit 55 is provided on the circuit board 70.

Referring to FIGS. 3 and 5, the circuit board 70 is a washer-shaped and ring-shaped substrate having a circular opening in the center thereof. The circuit board 70 is disposed on the outer peripheral side of the bearing accommodation portion 13b such that it is substantially concentric with the spool shaft 20. The circuit board 70 is fixed to the inner surface of the wall portion 13a of the spool support portion 13 by three screws 93. When mounting the circuit board 70 with the screws 93, for example, a jig is temporarily positioned on the bearing accommodation portion 13b to center the circuit board 70. The circuit board 70 is then disposed so that it is substantially concentric with respect to the axis of the spool shaft 20. Because of this, when the circuit board 70 is mounted to the spool support portion 13, the coils 62 fixed to the circuit board 70 will be disposed substantially concentric with the axis of the spool shaft 20.

Here, the dimension of the reel unit 1 in the spool shaft direction can be made smaller than that when the circuit board 70 is mounted in a space between the spool support portion 13 and the first side cover 6, because the circuit board 70 is mounted to the opened outer wall surface of the spool support portion 13 that forms a part of the reel unit 1. This allows the overall size of the reel unit 1 to be reduced. In addition, because the circuit board 70 is mounted on a surface of the spool support portion 13 that faces the flange portion 12a of the spool 12, the coils 62 mounted around the periphery of the rotor 60 can be directly attached to the circuit board 70. Because of this, lead wires that connect the coils 62 and the circuit board 70 will be unnecessary, and insulation failure between the coils 62 and the circuit board 70 is reduced. Moreover, because the coils 62 are mounted to the circuit board 70 attached to the spool support portion 13, the coils 62 can also be mounted to the spool support portion 13 only by attaching the circuit board 70 to the spool support portion 13. Because of this, the spool braking mechanism 25 is easily assembled.

Figure 7:
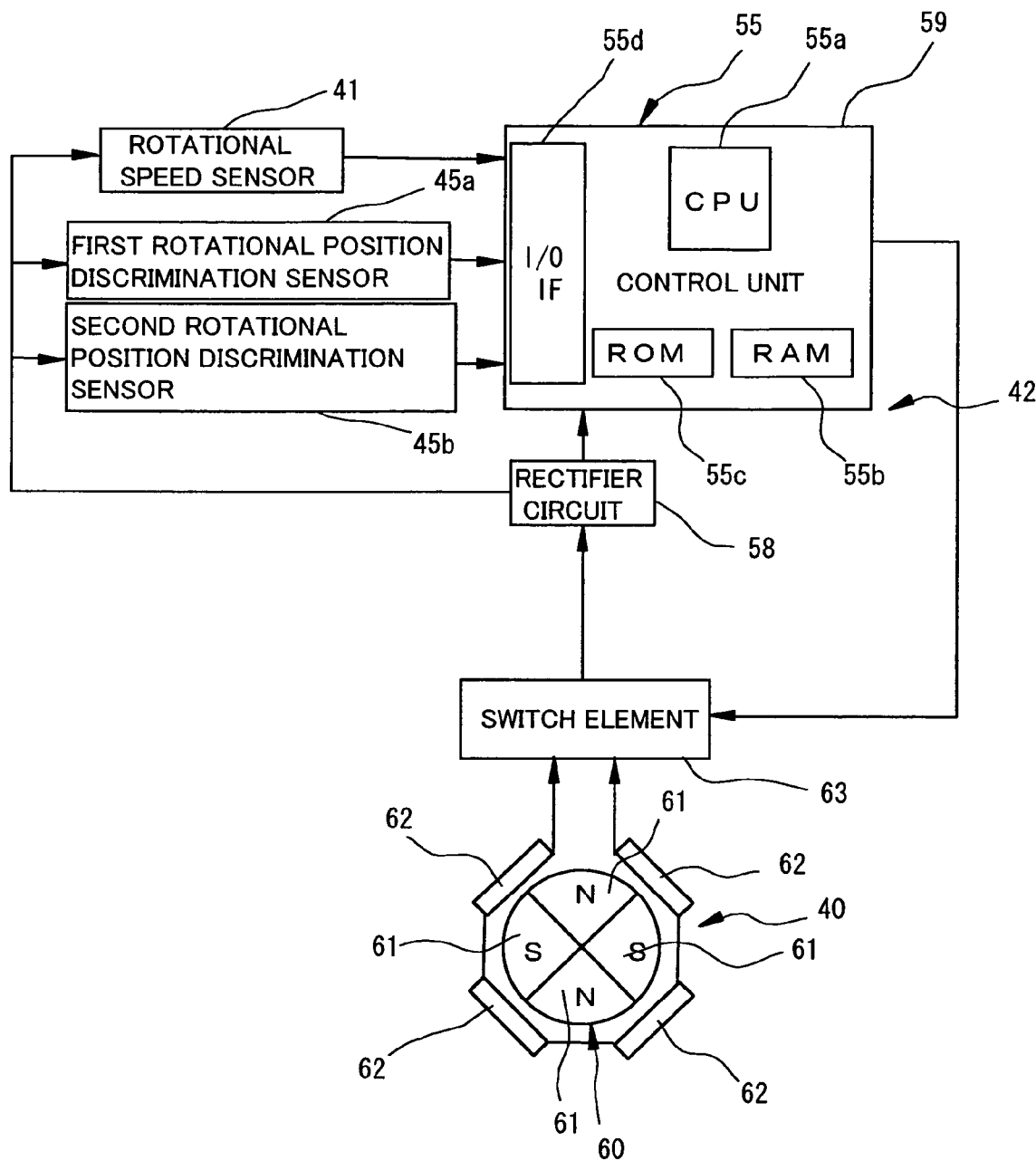
FIG. 7 is a block diagram of the spool braking device in accordance with the first embodiment of the present invention.

As shown in FIG. 7, the control unit 55 includes, for example, a microcomputer 59 with a CPU 55a, a RAM 55b, a ROM 55c, an I/O interface 55d and the like. The microcomputer 59 is disposed on the circuit board 70. A control program is stored in the ROM 55c of the control unit 55, as well as data such as types of basic braking patterns to be used, degrees of the eight-level strengths of the basic braking patterns, and the like, in each of the braking modes according to four or more basic braking patterns and casting conditions. In addition, a preset value for tension and for rotational speed in each of the braking modes as well as time data for determining timing are also stored in the ROM 55c. In the present embodiment, even in the same braking mode, different basic braking patterns may be used depending on the strength levels thereof. The basic braking patterns and the strength thereof are stored in the ROM 55c. However, it will be apparent to one of ordinary skill in the art from this disclosure that all of the braking patterns may be stored therein.

The rotational speed sensor 41 for detecting the rotational speed of the spool 12, the first rotational position discrimination sensor 45a for detecting the rotational position of the setting knob 44, and the second rotational position discrimination sensor 45b for detecting the rotational position of the adjustment knob 43 are connected to the control unit 55. In addition, gates of each of the FETs of the switch element 63 are connected to the control unit 55. The control unit 55 controls the on/off state of the switch element 63 of the spool braking unit 40 in response to pulse signals from each of the rotational speed sensor 41, the first rotational position discrimination sensor 45a, or the second rotational position discrimination sensor 45b by PWM (pulse width modulated) signals having cycles of, for example, 1/1000 seconds that are generated by a control program. Specifically, the control unit 55 controls the on/off state of the switch element 63 by selecting any of the combinations of the four braking patterns, and the eight strength levels thereof whose duty ratio D is varied with the course of time depending on the four operating positions of the setting knob 44 and the eight operating positions of the adjustment knob.

The first and second rotational position discrimination sensors 45a and 45b comprise brush members 45c and 45d, respectively, both of which are formed on the circuit board 70 and shunt the discrimination patterns.

A rectifier circuit 58 is connected to the switch element 63. It converts alternating current from the spool braking unit 40 to direct current, stabilizes the voltage, and outputs it to the control unit 55 and the rotational speed sensor 41. The rectifier circuit 58 is also mounted to the circuit board 70.

Operation and Function of Reel during Actual Fishing

When casting, the clutch lever 17 is pressed down to place the clutch mechanism 21 in the clutch off position. The spool 12 can rotate freely in this clutch off state. When casting, fishing line will be paid out of the spool 12 at full speed due to the weight of the tackle. When the spool 12 rotates due to casting, the magnets 61 rotate around the inner peripheral sides of the coils 62. If the switch element 63 is turned on, an electric current will flow through the coils 62 and the spool 12 will be braked. During casting, the rotational speed of the spool 12 will gradually become faster. If the rotational speed of the spool 12 exceeds the peak, it will gradually become slower.

Here, even if the magnets 61 are disposed near the bearing 26b, it will be difficult for the bearing 26b to become magnetized and the free rotational ability of the spool 12 will be enhanced because the magnetic washer member 66 is disposed between the magnets 61 and the bearing 26b and there is a gap of approximately 2.5 mm or greater, for example, between the magnets 61 and the bearing 26b. In addition, it will be difficult for cogging to be produced and the free rotational ability of the spool 12 will be enhanced because the coils 62 are coreless coils.

When the tackle lands in the water, the handle 2 is rotated in the line winding direction, and the clutch mechanism 21 will be placed in the clutch-on state by a clutch return mechanism (not shown). Then, the reel unit 1 will be held to await a bite from a fish.

Control Operation of the Control Unit

Next, the schematic braking control performed by the control unit 55 when casting is explained based upon graphs showing the braking patterns in the braking modes. The braking patterns are patterns in which the braking force (the duty ratio of the switch element 63) is varied in the elapsed braking time from the start of casting. The present inventors discovered that if a large braking force is applied when this tension is at or below a predetermined value, the attitude of the tackle (lure) will reverse and fly with a stable attitude just before the peak of the rotational speed. The following control is carried out in order to make the tackle fly with a stable attitude by braking the spool 12 just before the peak of the rotational speed. In other words, during the initial phase of casting, a strong braking force is applied at the highest duty ratio for a short period of time, and the attitude of the tackle (lure) will reverse. Then, the braking force will be reduced by gradually decreasing the duty ratio.

Figure 8:
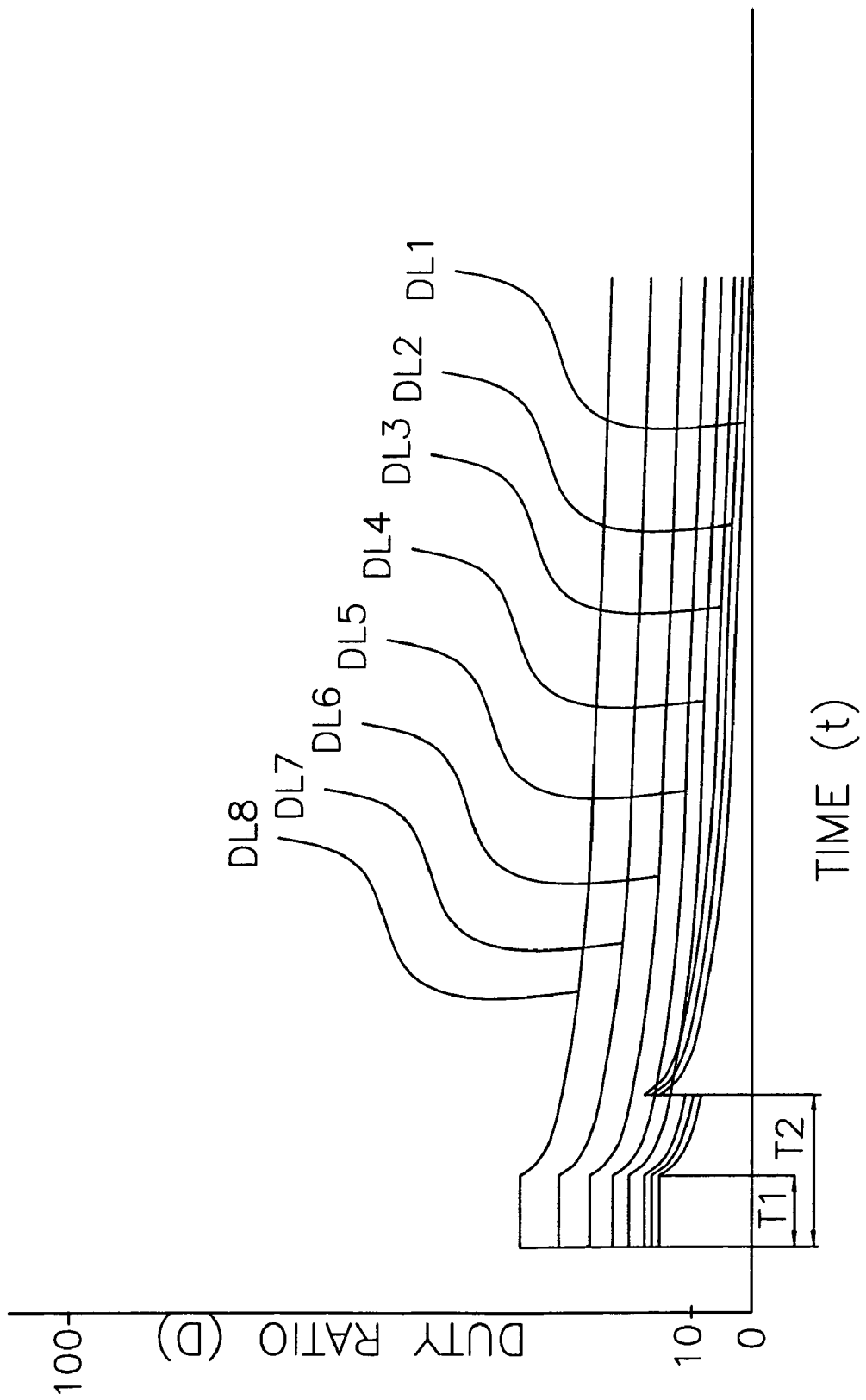
FIG. 8 is a graph schematically showing changes in duty ratios of braking patterns in a braking mode L for the spool braking device in accordance with the first embodiment of the present invention.
Figure 9:
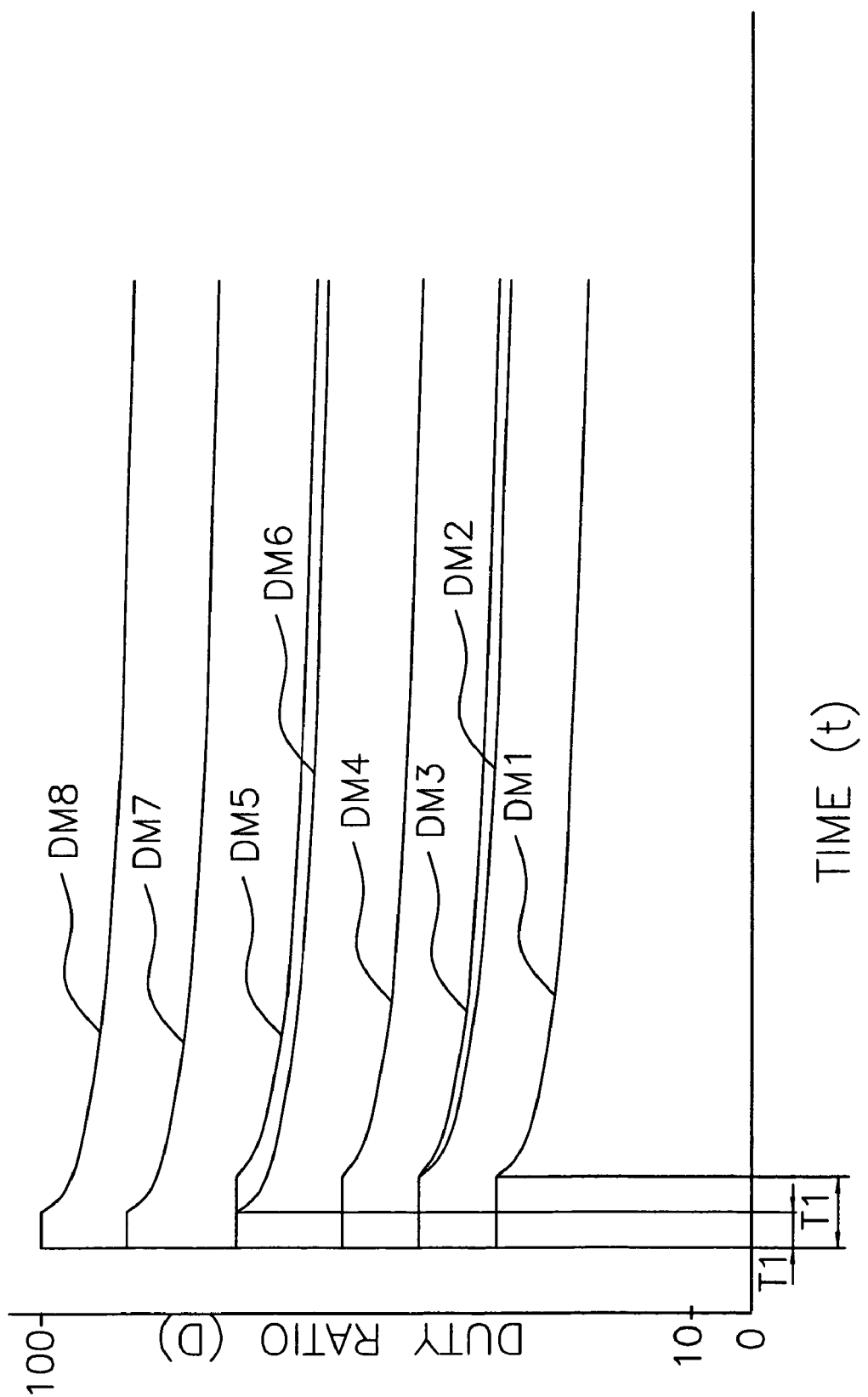
FIG. 9 is a graph schematically showing changes in duty ratios of braking patterns in a braking mode M for the spool braking device in accordance with the first embodiment of the present invention.
Figure 10:
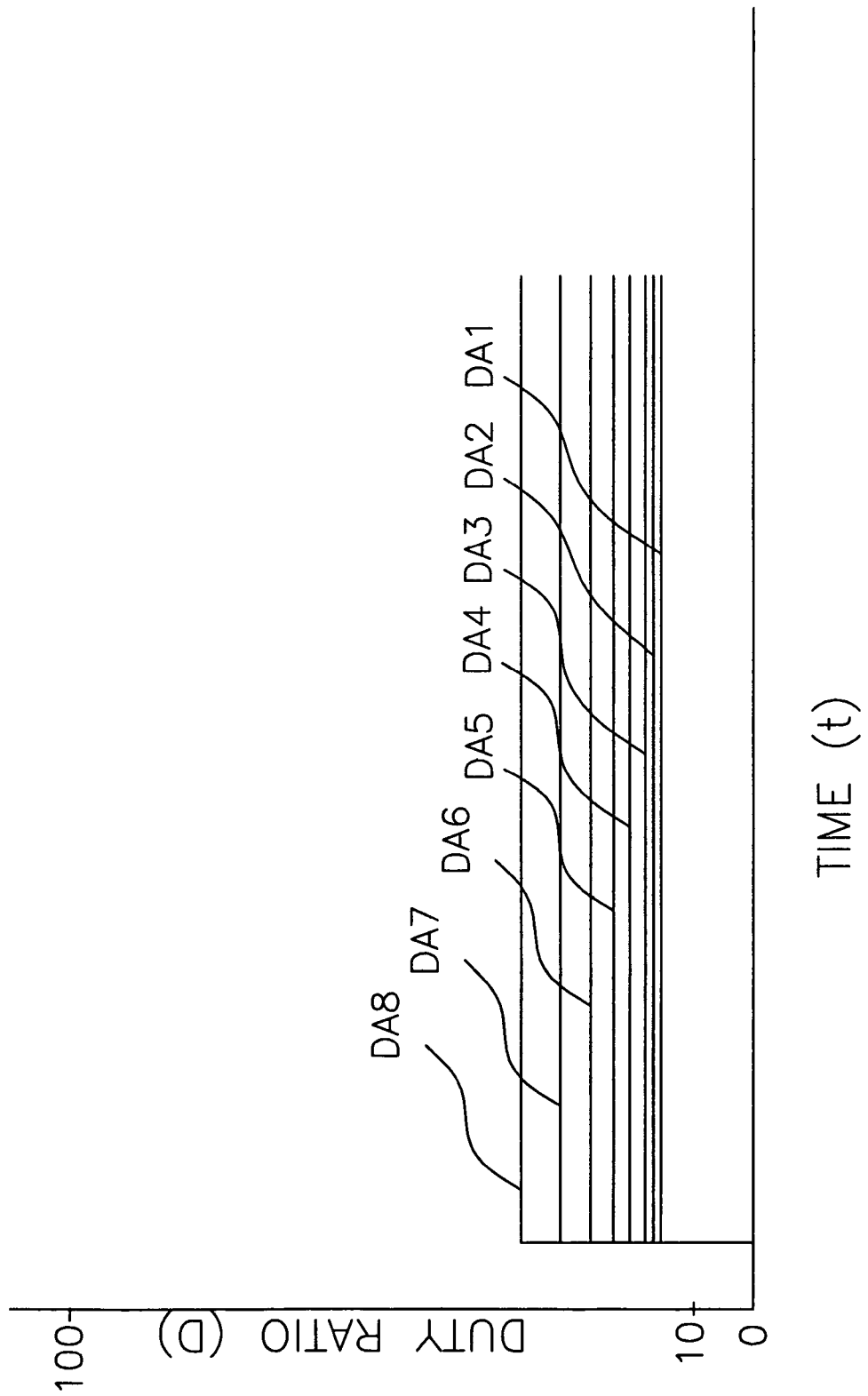
FIG. 10 is a graph schematically showing changes in duty ratios of braking patterns in a braking mode A for the spool braking device in accordance with the first embodiment of the present invention.
Figure 11:
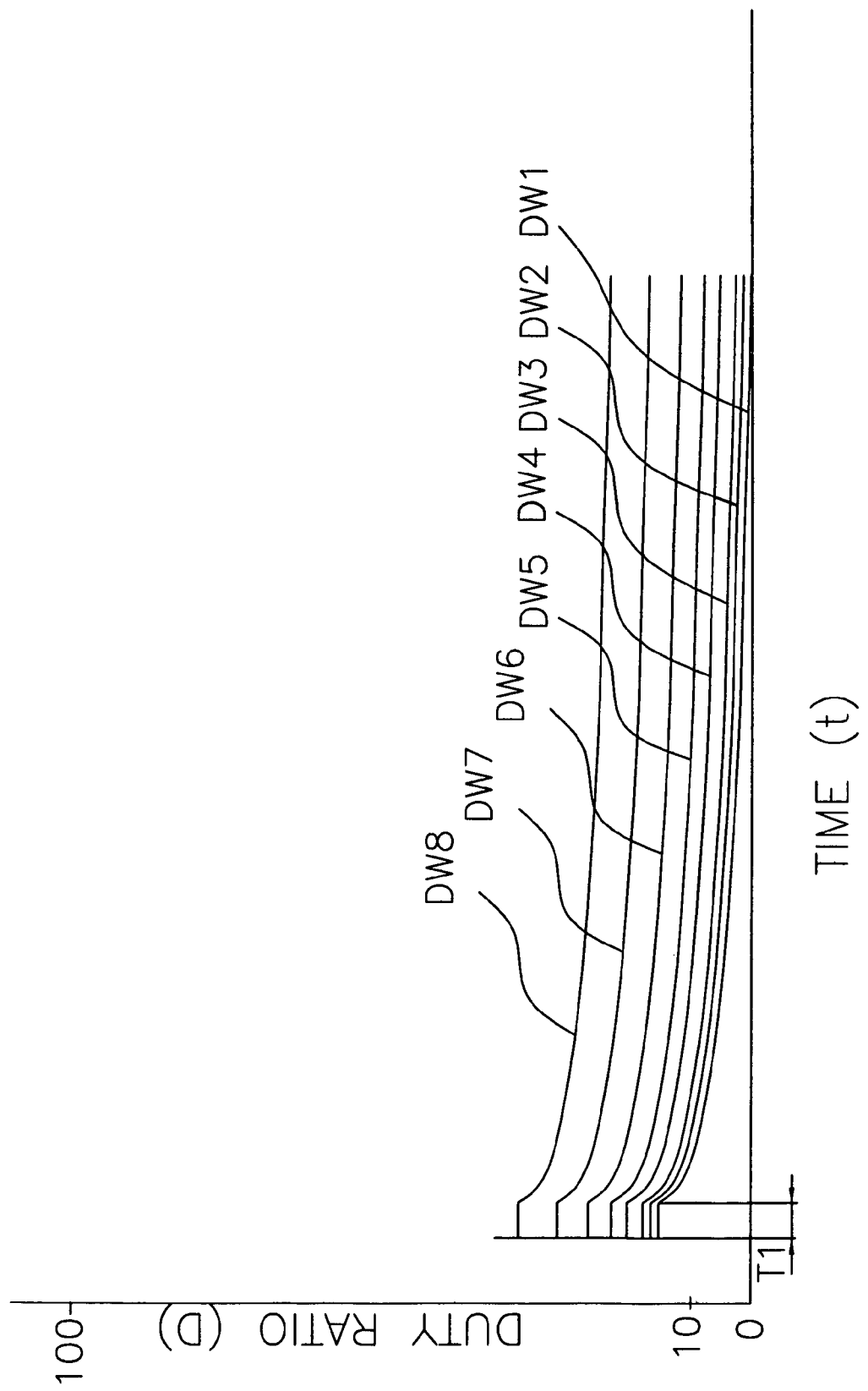
FIG. 11 is a graph schematically showing changes in duty ratios of braking patterns in a braking mode W for the spool braking device in accordance with the first embodiment of the present invention.

In this spool braking mechanism 25, the strength of the four braking modes shown in FIGS. 8-11 are adjustable in eight levels. Referring to FIGS. 8-11, the vertical axis is duty ratio and the horizontal axis is elapsed time since casting. A braking mode shown in FIG. 8 is a braking mode L to be used for long-distance casting. A braking mode shown in FIG. 9 is a standard braking mode M. In addition, a braking mode shown in FIG. 10 is a braking mode A in which rapid and strong braking is performed to make an accurate short-distance casting. A braking mode shown in FIG. 11 is a braking mode W to be used when fluoro line with a relative density that is higher than that of nylon fishing line is used or when a head wind is blowing.

A control commonly performed among the braking modes is a control where braking is not performed at the start of rotation of the spool 12 when casting and braking is started when tension is at or below a predetermined value. In addition, braking is performed at the maximum value in each of the braking modes during a first predetermined time T1 (e.g., approximately 0.2 to 0.5 seconds), that is, from the start of braking until the rotational speed passes the peak.

In the braking mode L shown in FIG. 8, braking patterns (DL1 to DL3) of the weaker first to third levels are patterns corresponding to special purposes such as long-distance casting competitions or the like. In each of these three levels, the maximum duty ratio is applied until the first predetermined time T1 (e.g., approximately 0.2 to 0.5 seconds) has elapsed since the start of braking. After the first predetermined time T1 has elapsed, the duty ratio is gradually decreased. However, in order to apply a braking force corresponding to thumbing while the duty ratio is decreased, a duty ratio that is approximately the same as the maximum duty ratio in each of the braking patterns is instantaneously applied after a second predetermined period of time T2 (e.g., approximately one second) has elapsed since the start of braking. Then, the duty ratio is gradually decreased. Because of this, it is possible to effectively prevent backlash that is caused when the speed of paying out fishing line exceeds the rotational speed of the spool and then the fishing line is slacked. Braking patterns (DL4 to DL8) of the fourth to eighth levels are patterns corresponding to, for example, a long-distance casting with a metal jig or the like. Here, the duty ratio will be gradually decreased after the first predetermined time T1 (e.g., approximately 0.2 to 0.5 seconds) has elapsed since the start of braking. In the braking mode L, the maximum duty ratio of the maximum braking pattern DL8 is approximately 50% or less, for example. Therefore, in the braking mode L, the basic braking patterns of the first to third levels and those of the fourth to eighth levels are different.

In the braking mode M shown in FIG. 9, the duty ratios of the weaker first and second braking patterns (DM1 and DM2) are gradually decreased after the first predetermined time T1 (e.g., approximately 0.2 to 0.5 seconds) has elapsed since the start of braking. These decreasing patterns of the duty ratios (i.e., time-series variations of the duty ratios) are the same as those in the braking mode L, and correspond to those of the ninth and tenth levels in the braking mode L. Braking patterns (DM3 to DM5) of the third to fifth levels are patterns corresponding to, for example, a heavy and good-flying minnow or the like. Here, the duty ratios will be gradually decreased after the first predetermined time T1 (e.g., approximately 0.2 to 0.5 seconds) has elapsed. At this time, decreasing degrees in the decreasing patterns of the duty ratios after the first predetermined time T1 (e.g., approximately 0.2 to 0.5 seconds) has elapsed are larger than those in the braking mode L. In the present embodiment, the maximum duty ratio of the braking pattern DM3 of the third level is the same as that of the braking pattern DM2 of the second level, but the decreasing degrees of these braking patterns are different from each other. In addition, the braking patterns (DL6 to DL8) of the sixth to eighth levels are patterns corresponding to a minnow that is difficult to cast a long distance. Here, the duty ratio will be gradually decreased after the first predetermined time T1 (e.g., approximately 0.2 to 0.3 seconds) has elapsed since the start of braking. In other words, the first predetermined time T1 in which the maximum duty ratio in each of the levels is given is shortened. Note that in the braking mode M, the maximum duty ratio of the maximum braking pattern DM8 is 90% or less. Therefore, in the braking mode M, the basic braking patterns are different among groups of the first and second levels, the third to fifth levels, and the sixth to eighth levels.

Constant duty ratios are given in the braking mode A, shown in FIG. 10, so that strong and approximately constant braking force is given for each of the levels (DA1 to DA8). Because of this, it is possible to deal with a short-distance casting with a fast initial speed. The maximum duty ratio in each of the levels is the same as that in the braking mode L. Therefore, the same basic braking pattern is used in each of the levels in the braking mode A.

In the braking mode W shown in FIG. 11, the duty ratio will be gradually decreased at the same decreasing degree as that in the sixth to eighth levels (DM6 to DM8) in the braking mode M after the first predetermined time T1 (e.g., approximately 0.2 to 0.3 seconds) has elapsed since the start of braking. Note that the maximum duty ratio in each of the levels is the same as that in the braking mode L. Because of this, it will be easier to deal with head wind and a high-density fluoro line. Therefore, the same basic braking pattern is used in each of the levels in the braking mode W.

Figure 12:
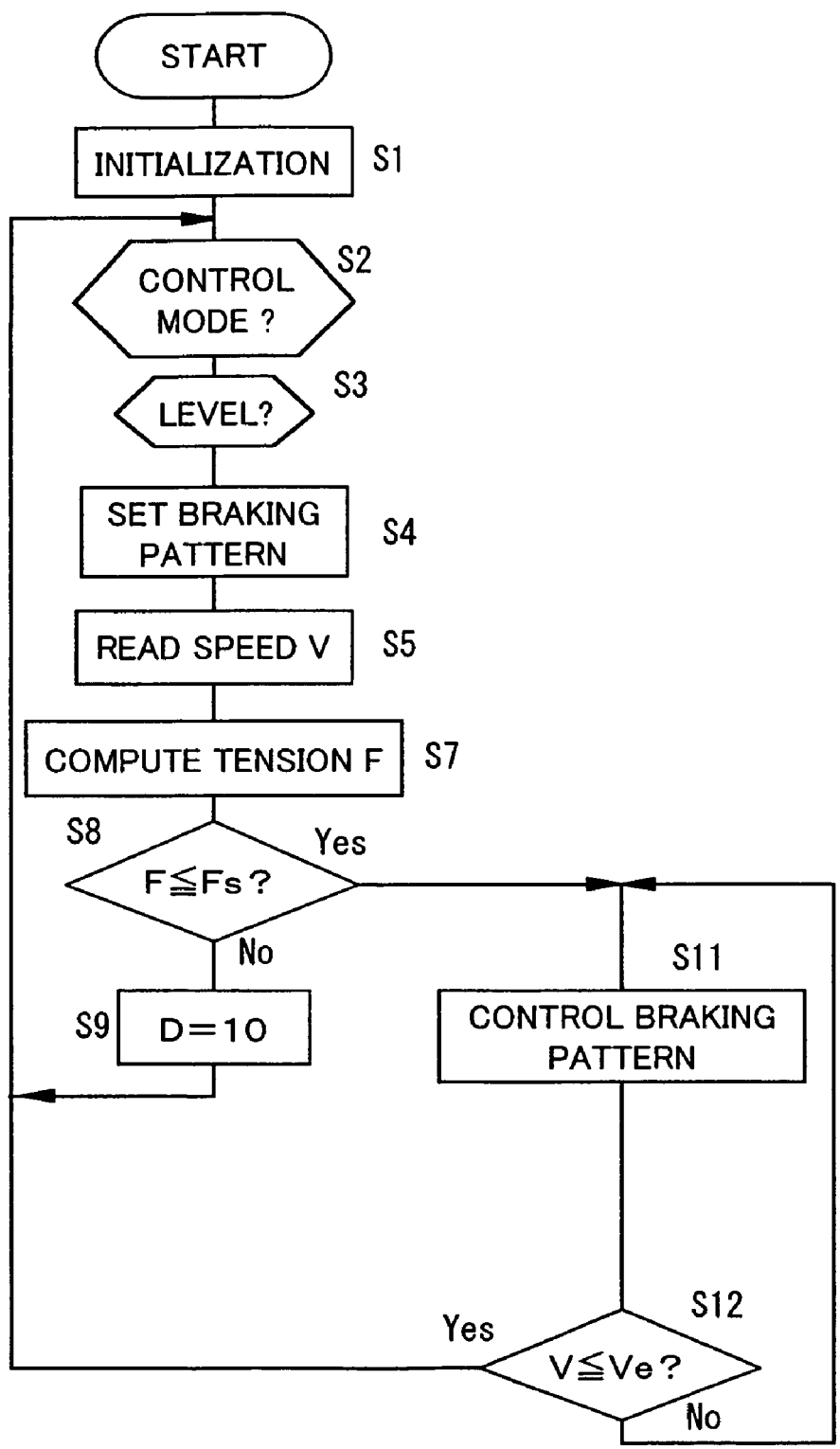
FIG. 12 is a flowchart showing a control operation of a spool controlling unit of the spool braking device in accordance with the first embodiment of the present invention.

Next, the specific braking control operation of the control unit 55 will be explained in reference to a control flowchart of FIG. 12.

Initialization is performed in Step S1 when the spool 12 rotates due to casting and electric power is applied from the coils 62. Here, various flags and variables are reset. In Step S2, it is determined which braking mode is selected by turning around the setting knob 44 by signals from the first rotational position discrimination sensor 45*a*. In Step S3, it is determined which level is selected by turning the adjustment knob 43 by signals from the second rotational position discrimination sensor 45*b*. In Step S4, the selected braking mode and the braking pattern according to the level thereof are read out from the ROM 55*c* and the read-out braking pattern is set to the RAM 55*b*. In the following steps, the brake operation will be performed with the changed braking pattern until the adjustment knob 43 and the setting knob 44 are turned around to the different positions next time. In addition, a duty ratio D that corresponds to the braking pattern is read out from the RAM 55*b* inside the control unit 55 in the following controls. In Step S5, a rotational speed V of the spool 12 during the initial phase of casting is detected by pulses from the rotational speed sensor 41. In Step S7, tension F that is applied to fishing line paid out from the spool 12 is computed.

Here, the tension F is determined based on the rate of change of the rotational speed of the spool 12 (Δω/Δt) and the moment of inertia J of the spool 12. The difference between the rotational speed of the spool 12 at a certain point and the rotational speed of the spool 12 when it freely and independently rotates without receiving tension from fishing line is due to rotational drive force (torque) generated by the tension from fishing line. If the rate of change of the rotational speed at this time is defined as (Δω/Δt), then the drive torque T can be expressed as the following equation (1).

$$T = J \times (\Delta\omega/\Delta t) \quad (1)$$

If the drive torque T is determined from the equation (1), the tension is determined based on the radius of the point of application of the fishing line (normally 15 to 20 mm).

In Step S8, it is determined whether or not the tension F computed by the rate of change of the rotational speed (Δω/Δt) and the moment of inertia J is at or below a predetermined value Fs (for example, a value in a range between approximately 0.5N and 1.5N). If the tension F exceeds the predetermined value Fs, the process moves to Step S9 and the duty ratio D is controlled to be 10. In other words, the switch element 63 is controlled to be turned on for only approximately 10% of a cycle, for example. Then, the process returns to Step S2. Because of this, the spool braking unit 40 slightly brakes the spool 12, but the spool braking unit 40 generates electricity. Therefore, the spool controlling unit 42 will stably operate.

If the tension F is at or below the predetermined value Fs, then the process moves to Step S11. In step S11, a duty ratio D that corresponds to the braking pattern is read out from the RAM 55*b*, and the PWM control is performed with respect to the switch element 63. In the present embodiment, the duty ratio D will be gradually decreased from the point when the braking force is the maximum, that is, when the duty ratio D in each of the levels is the highest. In this way, when a strong braking force is applied according to a tackle for a short period of time, the tackle will fly while the attitude thereof will reverse from its fishing line engagement portion and the fishing line engagement portion will be in front. Because of this, the attitude of the tackle will be stable and thus, the tackle will fly further.

In Step S12, it is determined whether or not the speed V is at or below a brake completion speed Ve. When the speed V is at or below the brake completion speed Ve, the process returns to Step S2, and a series of braking processes in casting is completed. On the other hand, when the speed V exceeds the brake completion speed Ve, the process returns to Step S11.

Here, two operating members, that is, the adjustment knob 43 and the setting knob 44 are provided for setting the braking force. Therefore, it is possible to minutely adjust the braking properties according to a plurality of casting conditions such as the mass change of a tackle, types of fishing line, casting methods, situations of fishing spots, and the like, by properly using both functions of the adjustment knob 43 and the setting knob 44 without minutely setting the moving distance of the adjustment knob 43 and the setting knob 44. Because of this, operation of the adjustment knob 43 and the setting knob 44 will make it possible to promptly find out an optimal casting condition with an easy operation.

A plurality of basic braking patterns is used in each of the braking modes. However, it will be apparent to one of ordinary skill in the art from this disclosure that a single basic braking pattern may be used in each of the braking modes and may be shifted according to an operating position of the adjustment knob 43.

The spool 12 is controlled so that it is braked before the rotational speed thereof reaches a maximum. However, the present invention can be applied to braking the spool after the rotational speed thereof reaches a maximum.

Power from the spool braking unit is directly provided to the control unit 55 and the rotational speed sensor 41 through the rectifier circuit 58. However, rectified power may be stored and then provided. Specifically, power may be stored in an electric storage element such as a secondary battery, a condenser or the like. The electric storage element may be used as a power source of the control unit 55. In addition, a battery functioning as a power source may be separately provided. The spool speed and the braking power may be displayed on a display unit that is driven by the power supplied from the battery.

Second Embodiment

Figure 13:
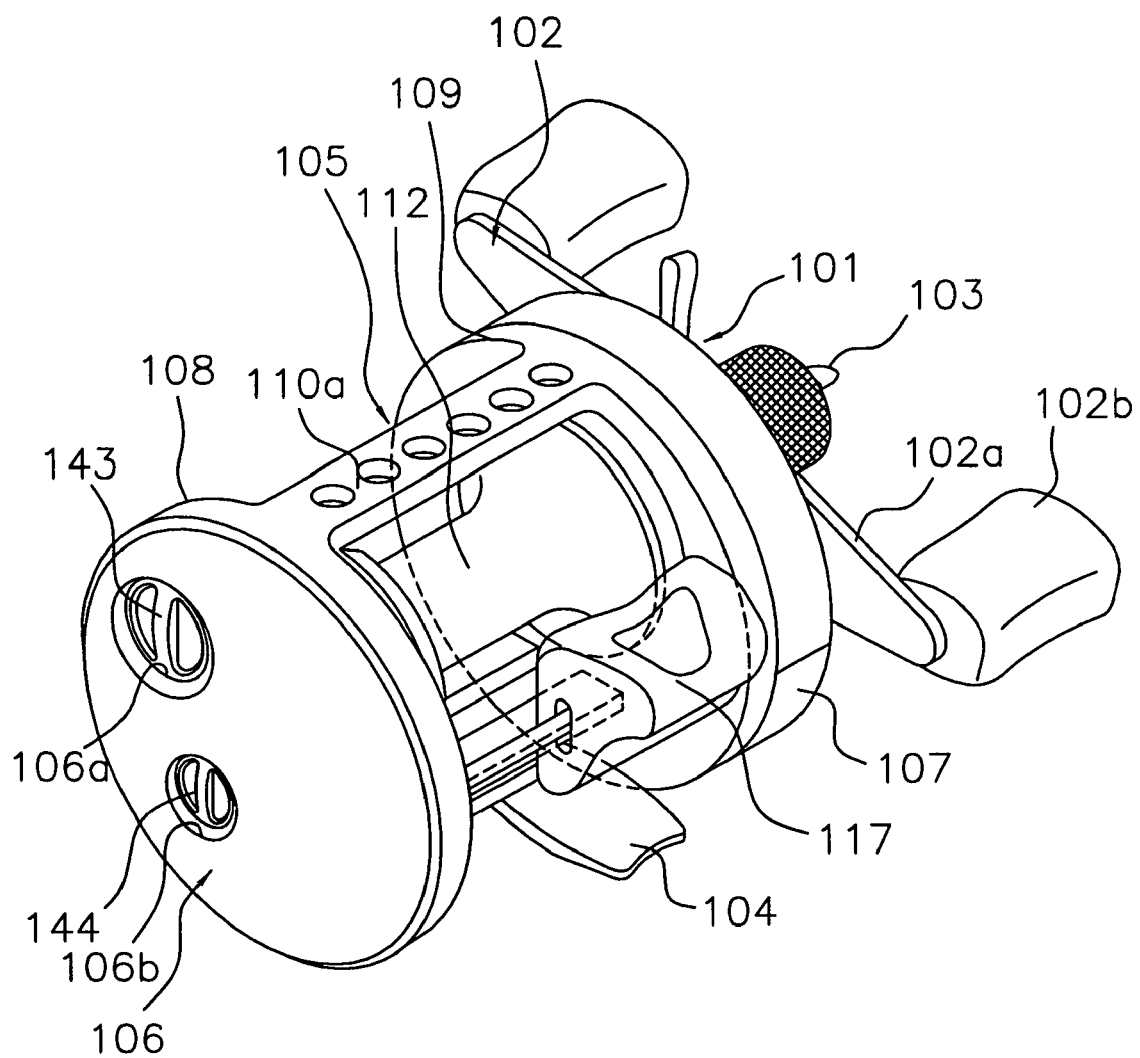
FIG. 13 is a perspective view of a dual bearing reel equipped with a spool braking device in accordance with a second embodiment of the present invention.

Referring now to FIG. 13, a round-type dual bearing reel in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the present invention is explained with a low-profile dual bearing reel. As shown in FIG. 13, the present invention can be applied to a round-type dual bearing reel. In the second embodiment, not only an adjustment knob 143 but also a setting knob 144 is exposed outside. A reel unit 101 includes a frame 105, a first side cover 106 and a second side cover 107. The first and second side covers are mounted to respective lateral sides of the frame 105. A plurality of circular opening portions 106a and 106b are formed in the first side cover 106. The opening portion 106b is formed for exposing the setting knob 144 outside. Braking modes can be changed in a variety of types by the setting knob 144 according to the aforementioned fishing line types, casting types, wind directions, or the like.

The adjustment knob 143 is a knob for adjusting the strength of the braking force in eight levels, for instance. The setting knob 144 is a knob for selecting a braking pattern. The braking patterns are different from each other in each of the braking modes. The strengths of the braking patterns are adjusted by the adjustment knob 143. Specifically, the basic braking pattern is shifted according to an operating position of the adjustment knob 143.

Third Embodiment

Figure 14:
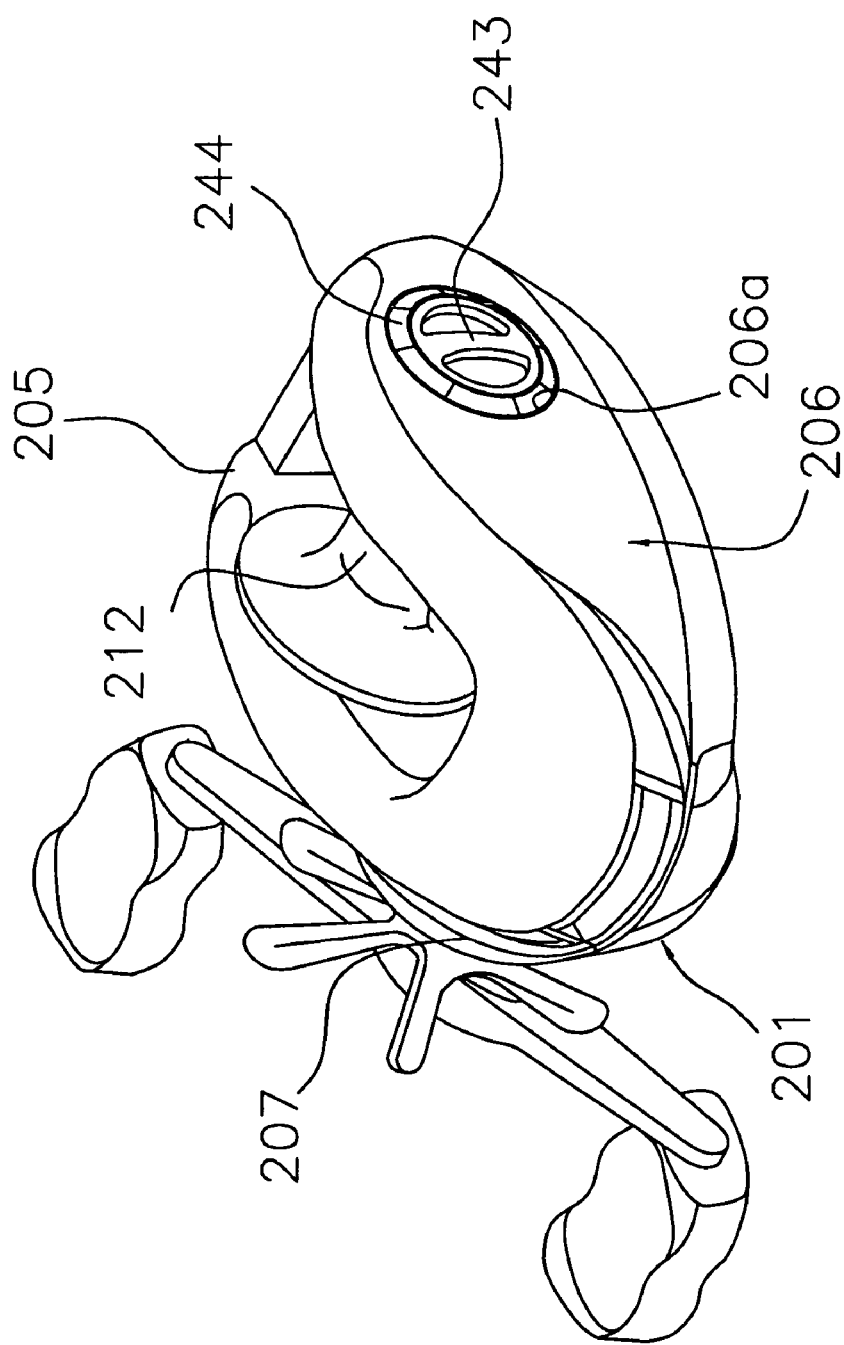
FIG. 14 is a perspective view of a dual bearing reel equipped with a spool braking device in accordance with a third embodiment of the present invention.

Referring now to FIG. 14, a dual bearing reel in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the second embodiment, the adjustment knob 143 and the setting knob 144 are separately disposed. However, an adjustment knob 243 and a setting knob 244 may be disposed on the inner periphery and the outer periphery so that they are concentrically disposed with each other. The first and second operating members are coaxially arranged. In this case, it is preferable to dispose the frequently operated adjustment knob 243 at an easy-to-use position on the inner periphery side. Conversely, the setting knob 244 may be disposed at this position. Furthermore, when the adjustment knob 243 is disposed on the inner periphery side, the setting knob 244, which is disposed on the outer peripheral side, may be hidden inside a first side cover 206 and thus operation thereof may be regulated.

With this embodiment, the same working effects as those of the aforementioned embodiments can also be obtained. In addition, change of the braking modes and adjustment of the strength of the braking force will be performed easily because two knobs 243 and 244 are concentrically disposed with each other.

In the first and third embodiments, an openable first side cover 6 is explained as an example of an operation regulating mechanism for the setting knob 44. However, it will be apparent to one of ordinary skill in the art from this disclosure that the operation regulating mechanism is not limited to the first side cover 6. For example, the setting knob 44 may be regulated by applying resistance to the movement of the setting knob 44 so that it is more difficult for the setting knob 44 to be turned in comparison to the adjustment knob 43, or by providing a lock mechanism by which the setting knob 44 can be locked/unlocked.

The terms of degree such as "substantially", "about" and "approximately" as used herein mean a reasonable amount of deviation of the modified term such that the end result is not significantly changed.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

It will be apparent to those of ordinary skill in the art from this disclosure that the precise structure and algorithms for the spool controlling unit 42 can be any combination of hardware and software that will carry out the functions of the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool braking device for a dual bearing reel comprising
    a spool braking unit configured to brake for a spool;
    a first operating member configured to be movably mounted to a reel unit and configured and arranged to be selectively moved to a plurality of first operation positions;
    a second operating member configured to be movably mounted to the reel unit and configured and arranged to be selectively moved to a plurality of second operating positions; and
    a spool controlling unit that includes a microcomputer having a computer-readable medium, the spool controlling unit configured to control a braking force of the spool braking unit according to the first operating positions of the first operating member and the second operating positions of the second operating member, the spool controlling unit controlling the spool braking unit with a plurality of strength braking patterns, the strength breaking patterns being produced from a plurality of basic braking patterns wherein each of the basic breaking patterns has a different braking force that varies as a function of time.

2. The spool braking device according to claim 1, wherein the spool braking unit is configured to electrically control braking for the spool, and the spool controlling unit is configured to electrically control a braking force of the spool braking unit.

3. The spool braking device according to claim 2, wherein the spool braking unit includes
    a first selection device that selects any of a plurality of braking modes including at least one of the plurality of basic braking patterns according to the operated first operating position of the first operating member, and
    a second selection device that selects one of the plurality of strength braking patterns of the braking mode selected according to the operated second operating position of the second operating member, and the spool braking unit is controlled by a selected strength braking pattern from the strength braking patterns.

4. The spool braking device according to claim 2, wherein the spool braking unit includes
a rotor having a plurality of magnets that are aligned in a rotational direction and have interchangeably opposite polarities, the rotor rotates in association with the spool,
a plurality of coils serially connected and configured to be mounted to a portion of the reel unit at predetermined intervals in a circumferential direction so that they surround the rotor, and
a switch element connected to both ends of the plurality of coils serially connected to each other, and
the spool controlling unit controls an on/off state of the switch element.

5. The spool braking device according to claim 4, wherein the spool controlling unit controls the on/off state of the switch element by controlling a duty ratio of pulse width modulation (PWM) signals with a predetermined cycle.

6. The spool braking device according to claim 5, wherein any of the plurality of the basic braking patterns is configured such that after a first time period has elapsed from the start of casting, the spool is braked with the constant duty ratio of 20% to 100% of a maximum braking force during a second time period, the spool is braked with a duty ratio that gradually decreases from the constant duty ratio during a third time period.

7. The spool braking device according to claim 1, further comprising
an operation regulating mechanism that regulates an operation of the first operating member.

8. The spool braking device according to claim 1, wherein the computer readable medium includes information regarding the plurality of basic braking patterns.

9. A dual bearing reel comprising:
a reel unit including a frame, a first side cover and a second side cover, the frame having first and second side plates, the first and second side covers covering the first and second side plates, respectively;
a spool rotatably mounted to the reel unit;
a handle configured to rotate the spool; and
a spool braking device configured to brake the spool and including
a spool braking unit configured to electrically control braking for the spool,
a first operating member movably mounted to the reel unit and configured and arranged to be selectively moved to a plurality of first operation positions,
a second operating member movably mounted to the reel unit and configured and arranged to be selectively moved to a plurality of second operating positions, and
a spool controlling unit that includes a microcomputer having a computer-readable medium, the spool controlling unit configured to electrically control a braking force of the spool braking unit according to the first operating positions of the first operating member and the second operating positions of the second operating member, the spool controlling unit controlling the spool braking unit with a plurality of strength braking patterns, the strength breaking patterns being produced from a plurality of predetermined braking patterns wherein each of the predetermined braking patterns has a different braking force that varies as a function of time.

10. The dual bearing reel according to claim 9, wherein the spool braking unit is configured to electrically control braking for the spool, and the spool controlling unit is configured to electrically control a braking force of the spool braking unit.

11. The dual bearing reel according to claim 10, wherein the spool braking unit includes
a first selection device that selects any of a plurality of braking modes including at least one of the plurality of basic braking patterns according to the operated first operating position of the first operating member, and
a second selection device that selects one of the plurality of strength braking patterns of the braking mode selected according to the operated second operating position of the second operating member, and
the spool braking unit is controlled by a selected strength braking pattern from the strength braking patterns.

12. The dual bearing reel according to claim 10, further comprising
an operation regulating mechanism that regulates an operation of the first operating member.

13. The dual bearing reel according to claim 12, wherein the spool controlling unit controls the on/off state of the switch element by controlling a duty ratio of pulse width modulation (PWM) signals with a predetermined cycle.

14. The dual bearing reel according to claim 13, wherein any of the plurality of the basic braking patterns is configured such that after a first time period has elapsed from the start of casting, the spool is braked with the constant duty ratio of 20% to 100% of a maximum braking force during a second time period, the spool is braked with a duty ratio that gradually decreases from the constant duty ratio during a third time period.

15. The dual bearing reel according to claim 10, wherein the spool braking unit includes
a rotor having a plurality of magnets that are aligned in a rotational direction and have interchangeably opposite polarities, the rotor rotates in association with the spool,
a plurality of coils serially connected and mounted to a portion of the reel unit at predetermined intervals in a circumferential direction so that they surround the rotor, and
a switch element connected to both ends of the plurality of coils serially connected to each other, and
the spool controlling unit controls an on/off state of the switch element.

16. The dual bearing reel according to claim 10, wherein the first side cover is configured and arranged to expose the first operating member and cover the second operating member.

17. The dual bearing reel according to claim 10, wherein the first side cover is configured and arranged to expose the first and second operating members.

18. The dual bearing reel according to claim 10, wherein the first and second operating members are coaxially arranged.

19. The dual bearing reel according to claim 9, wherein the computer readable medium includes information regarding the plurality of predetermined braking patterns.

20. A dual bearing reel comprising:
a reel unit including a frame, a first side cover and a second side cover, the frame having first and second side plates, the first and second side covers covering the first and second side plates, respectively;
a spool rotatably mounted to the reel unit;
a handle configured to rotate the spool; and
a spool braking device configured to brake the spool and including a spool braking unit configured to electrically control braking for the spool, a first operating member movably mounted to the reel unit and configured and arranged to be selectively moved to a plurality of first operation positions, a second operating member movably mounted to the reel unit and configured and arranged to be selectively moved to a plurality of second operating positions, the first side cover configured and arranged to expose the first operating member and cover the second operating member, and a spool controlling unit configured to electrically control a braking force of the spool braking unit according to the first operating positions of the first operating member and the second operating positions of the second operating member.

* * * * *